(12) United States Patent
Sakurai

(10) Patent No.: US 11,278,812 B2
(45) Date of Patent: Mar. 22, 2022

(54) GAME APPARATUS, STORAGE MEDIUM STORING GAME PROGRAM, GAME SYSTEM, AND GAME PROCESSING METHOD

(71) Applicant: NINTENDO CO., LTD., Kyoto (JP)

(72) Inventor: Masahiro Sakurai, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 114 days.

(21) Appl. No.: 16/538,244

(22) Filed: Aug. 12, 2019

(65) Prior Publication Data

US 2020/0108319 A1  Apr. 9, 2020

(30) Foreign Application Priority Data

Oct. 4, 2018  (JP) .................................. 2018-189213
Oct. 4, 2018  (JP) ............................. JP2018-189212

(51) Int. Cl.
A63F 13/847   (2014.01)
A63F 13/63    (2014.01)
(Continued)

(52) U.S. Cl.
CPC .............. *A63F 13/63* (2014.09); *A63F 13/25* (2014.09); *A63F 13/42* (2014.09); *A63F 13/537* (2014.09);
(Continued)

(58) Field of Classification Search
CPC ...... A63F 13/42; A63F 13/537; A63F 13/847; A63F 13/833; A63F 13/822;
(Continued)

(56) References Cited

U.S. PATENT DOCUMENTS 6,273,822 B1 * 8/2001 Tanaka .................... A63F 13/10
463/43
6,354,940 B1 * 3/2002 Itou ......................... A63F 13/10
463/8
(Continued)

FOREIGN PATENT DOCUMENTS

JP      2014-061123 A     4/2014
JP      2014-233388 A    12/2014
(Continued)

OTHER PUBLICATIONS

"Smash Bros. Dojo!!", online, Nintendo Co., Ltd., searched on Sep. 13, 2018, internet <https://www.smashbros.com/wii/jp/gamemode/modea/modea12.html> with its English ver. <https://www.smashbros.com/wii/en_us/gamemode/modea/modea12.html>, printed Aug. 8, 2019.
(Continued)

*Primary Examiner* — Michael A Cuff
(74) *Attorney, Agent, or Firm* — Scully, Scott, Murphy & Presser, P.C.

(57) ABSTRACT

An example game apparatus executes an opponent information screen process of generating an image of an opponent information screen showing an opponent character and an opponent additional character, and executes a player information screen process of generating an image of a player information screen showing a player character and an additional character selected as an own additional character added to the player character according to an operational input. The image of the opponent information screen contains an opponent character image of the opponent character, an opponent additional character image of the opponent additional character, an own icon image, and an own type icon image. The image of the player information screen contains a player character image of the player character, an own additional character image of the selected own addi-
(Continued)

tional character, the own type icon image, an opponent icon image, and an opponent type icon image.

20 Claims, 20 Drawing Sheets

(51) Int. Cl.
    *A63F 13/25*     (2014.01)
    *A63F 13/833*     (2014.01)
    *A63F 13/42*     (2014.01)
    *A63F 13/537*     (2014.01)
    *A63F 13/58*     (2014.01)
    *A63F 13/795*     (2014.01)
    *A63F 13/843*     (2014.01)
    *A63F 13/24*     (2014.01)
    *A63F 13/327*     (2014.01)
    *A63F 13/214*     (2014.01)

(52) U.S. Cl.
    CPC ............ *A63F 13/58* (2014.09); *A63F 13/795* (2014.09); *A63F 13/833* (2014.09); *A63F 13/843* (2014.09); *A63F 13/847* (2014.09); *A63F 13/214* (2014.09); *A63F 13/24* (2014.09); *A63F 13/327* (2014.09); *A63F 2300/1043* (2013.01); *A63F 2300/1075* (2013.01); *A63F 2300/405* (2013.01); *A63F 2300/6018* (2013.01); *A63F 2300/8029* (2013.01)

(58) Field of Classification Search
    CPC .. A63F 13/5375; A63F 13/843; A63F 13/533; A63F 13/58; A63F 13/795; A63F 13/25; A63F 13/63; A63F 13/5378; A63F 13/327; A63F 13/214; A63F 13/24; A63F 2300/1075; A63F 2300/8029; A63F 2300/6018; A63F 2300/1043; A63F 2300/405
    USPC .......................................................... 463/31
    See application file for complete search history.

(56) References Cited

U.S. PATENT DOCUMENTS

| | | | | |
|---|---|---|---|---|
| 8,168,435 B2* | 5/2012 | Noguchi | ................. | A63F 13/44 436/5 |
| 8,801,515 B2* | 8/2014 | Ikeda | .................... | A63F 13/005 463/1 |
| 9,333,419 B2* | 5/2016 | Shimono | ................ | A63F 13/833 |
| 9,636,592 B2* | 5/2017 | Takeuchi | .............. | A63F 13/822 |
| 2004/0221224 A1* | 11/2004 | Blattner | .............. | H04L 12/1822 715/201 |
| 2006/0040738 A1* | 2/2006 | Okazaki | ............. | A63F 13/5258 463/32 |
| 2014/0004947 A1* | 1/2014 | Yamaguchi | ............. | A63F 13/00 463/31 |
| 2014/0087836 A1* | 3/2014 | Sato | ........................ | A63F 13/12 463/23 |
| 2014/0248948 A1* | 9/2014 | Ho | ........................ | A63F 13/426 463/31 |
| 2014/0357360 A1* | 12/2014 | Shono | .................... | A63F 13/573 463/31 |
| 2014/0364211 A1* | 12/2014 | Masuda | ................. | A63F 13/795 463/31 |
| 2015/0080122 A1* | 3/2015 | Motokura | ............... | A63F 13/22 463/31 |
| 2015/0141141 A1* | 5/2015 | Suzuki | ................... | A63F 13/795 463/31 |
| 2015/0202532 A1* | 7/2015 | Takeuchi | ................ | A63F 13/63 463/42 |
| 2015/0367240 A1* | 12/2015 | Otomo | .................. | A63F 13/847 463/7 |
| 2016/0236078 A1* | 8/2016 | Tokunaga | ............... | A63F 13/49 |
| 2018/0207537 A1* | 7/2018 | Kishimoto | ............... | A63F 13/58 |
| 2019/0160379 A1 | 5/2019 | Matsushita et al. | | |
| 2020/0023280 A1* | 1/2020 | Onda | ....................... | A63F 13/79 |

FOREIGN PATENT DOCUMENTS

JP     2016-165360 A     9/2016
JP     2017-185369 A     10/2017

OTHER PUBLICATIONS

U.S. Appl. No. 16/538,056, filed Aug. 12, 2019.
Yasuhara, K., "Boku no Natsuyasumi Portable 2, Equalifolia, Secret of Sunken Vessels", Aug. 19, 2013, pp. 32-33.
Masaru, I., "Wii U version Hyrule Warriors complete guide", Aug. 28, 2014, pp. 14-15 and 140-142.
Notice of Reasons for Refusal dated Feb. 1, 2021 received in Japanese Patent Application No. JP 2018-189213 together with and English language translation.
Yasuhara, K., "Boku no Natsuyasumi Portable 2, Equalifolia, Secret of Sunken Vessels", Aug. 19, 2010, pp. 32-32.
Masato, I., "Wii U version Hyrule Warriors complete guide", Aug. 28, 2014, pp. 14-15 and 140-142.

* cited by examiner

GAME APPARATUS, STORAGE MEDIUM STORING GAME PROGRAM, GAME SYSTEM, AND GAME PROCESSING METHOD

CROSS REFERENCE TO RELATED APPLICATIONS

The disclosures of Japanese Patent Application No. 2018-189212, filed Oct. 4, 2018, and Japanese Patent Application No. 2018-189213, filed Oct. 4, 2018, are incorporated herein by reference in their entirety.

FIELD

The technology disclosed herein relates to game apparatuses, storage media storing game programs, game systems, and game processing methods for performing games with competition.

BACKGROUND AND SUMMARY

There are conventional game programs that can enhance the performance of a player character in an action game by giving a predetermined effect to the character.

In the conventional art, when a player selects a character that is to be used in a game from characters, an effect which that character gives to another character is not shown to the player in an easy-to-understand manner. Therefore, it is difficult for a player to select a character, taking into account an effect which that character gives.

With this in mind, the present application discloses a game apparatus, game program, game system, and game processing method that allow a player to more easily and conveniently select a character in a game.

(1) A non-limiting example of a game apparatus disclosed herein is configured to, in a game in which a player character is operated to compete with an opponent character, generate an image of an opponent information screen showing the opponent character and an opponent additional character added to the opponent character for display. The game apparatus is also configured to generate an image of a player information screen showing the player character and an additional character selected according to an operational input of selection as an own additional character added to the player character for display. The additional character is associated with at least an image of the additional character, information of an effect given to performance in the game of the player character to which the additional character is added, and information about a type having advantage and disadvantage. The image of the opponent information screen contains an opponent character image of the opponent character, an opponent additional character image of the opponent additional character, an own icon image of the player character, and an own type icon image of a type of the selected own additional character. The image of the player information screen contains a player character image of the player character, an own additional character image of the selected own additional character, the own type icon image, an opponent icon image of the opponent character, and an opponent type icon image of a type of the opponent additional character. The game apparatus is also configured to make a screen transition to the player information screen in response to an operational input of a first screen transition during the opponent information screen being displayed. The game apparatus is also configured to make a screen transition to the opponent information screen in response to an operational input of a second screen transition during the player information screen being displayed. The game apparatus is also configured to start the game in response to an operational input of instruction to start the game during the opponent information screen or the player information screen being displayed. The game apparatus is also configured to control the player character in a virtual space according to an operational input, process the game based on the performance of the player character to which an effect associated with the selected own additional character is added, and the advantage and disadvantage associated with the type of the own additional character, and generate the image of the game screen for display.

According to the feature of (1), the game is performed with an additional character added to a player character and an opponent character, resulting in an improvement in the strategic aspect of the game. In addition, according to the feature of (1), the opponent information screen and the player information screen additional character are displayed to present information about an additional character to a player. Here, according to the feature of (1), the player can know information about both a player's characters and an opponent's characters in each of the opponent information screen and the player information screen, and can start the game from each information screen. This allows a player to easily select a character in the game. In addition, according to the feature of (1), in the opponent information screen and the player information screen, information about one of a player's or an opponent's characters is indicated by an icon image, and therefore, information about both characters can be shown without a display region related to information about one character excessively covering a display region related to information about the other character.

(2) The image of the game screen may contain an image of the virtual space, an image of the player character, an image of the own additional character added to the player character, and an image of the type of the own additional character.

According to the feature of (2), information about a player character, an own additional character, and a type of the own additional character, which is useful information, can be shown to a player during the character selection as well as during the game.

(3) The image of the game screen may further contain an image of the opponent character, an image of the opponent additional character added to the opponent character, and an image of the type of the opponent additional character.

According to the feature of (3), information about an opponent character, an opponent additional character, and a type of the opponent additional character, which is useful information, can be shown to a player during the character selection as well as during the game.

(4) The own type icon image and the opponent type icon image may contain, in addition to the image of the type, an image of advantage and disadvantage between the type of the selected own additional character and the type of the opponent additional character.

According to the feature of (4), the game apparatus can show advantage and disadvantage between a player's character and an opponent's character to a player in an easy-to-understand manner.

(5) The game apparatus may store a plurality of additional characters that are selectable as the own additional character, in a storage unit. The game apparatus may select the own additional character from the plurality of additional characters stored. The game apparatus may store, into the storage unit, the opponent additional character as an additional character that the player is allowed to select as the own additional character, in the game, if a giving condition for giving the opponent additional character to the player is satisfied in the game.

According to the feature of (5), a player can acquire an opponent additional character according to a giving condition. According to the feature of (5), in the opponent information screen, information about an opponent additional character is shown to a player. The player can know information about an opponent additional character that may be acquired, before the start of the game.

(6) The game apparatus may select the additional character or a character for which a type has not been set, as the opponent additional character. In the opponent additional character selection process, the game apparatus may set the type of the additional character as the type of the opponent additional character if the additional character has been selected as the opponent additional character, and may set a type that is previously set as the type of the opponent additional character if the character for which a type has not been set has been selected as the opponent additional character.

According to the feature of (6), an opponent character can be added to a character for which a type has not been set. Therefore, the game apparatus can set a larger number of characters as candidates for an opponent additional character to be selected. As a result, the strategic aspect of the game can be improved, and the amusingness of the game can be improved.

(7) In the starting the game, the game apparatus may generate an image of a waiting screen containing at least the player character image, the own additional character image, the own type icon image, the opponent character image, the opponent additional character image, and the opponent type icon image, for display, during at least a portion of a period of time from the time of an operational input of instruction to start the game until the start of the game.

According to the feature of (7), in the waiting screen shown before the start of the game, a player can know information about both the player's characters and an opponent's characters.

(8) The image of the opponent information screen and the image of the player information screen may further contain an instruction image of instruction to start the game, and the image of the waiting screen may not contain the instruction image.

According to the feature of (8), the game apparatus can easily provide a region that is large enough to display information about both a player's characters and an opponent's characters.

(9) In the opponent information screen, the opponent additional character image may be smaller than the opponent character image and may be larger than the own icon image. In the player information screen, the own additional character image may be smaller than the player character image and may be larger than the opponent icon image.

According to the feature of (9), in the opponent information screen and the player information screen, the game apparatus can show, to a player, characters in such an easy-to-understand manner that the player can distinguish a character which is added (i.e., an additional character) from a character to which another character is added (i.e., an opponent character and a player character). In addition, the game apparatus can show, to a player, characters in such a manner that information about one of a player's character and an opponent's character that is shown by an icon image does not much interfere with information about the other character, and one character can be distinguished from the other character.

Note that an example of an information processing program that causes a processor of an information processing device to execute the processes of (1)-(9) is disclosed herein. An example of an information processing system that executes the processes of (1)-(9) is also disclosed herein. An example of an information processing method for causing an information processing system to execute the processes of (1)-(9) is also disclosed herein.

According to the game apparatus, game program, game system, and game processing method, a player is allowed to easily select a character in a game.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

1. Configuration of Game System

A game system according to an example of an exemplary embodiment will now be described. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). The hardware configuration of the game system 1 according to the exemplary embodiment will now firstly be described, and the control of the game system 1 according to the exemplary embodiment will then be described.

Figure 1:
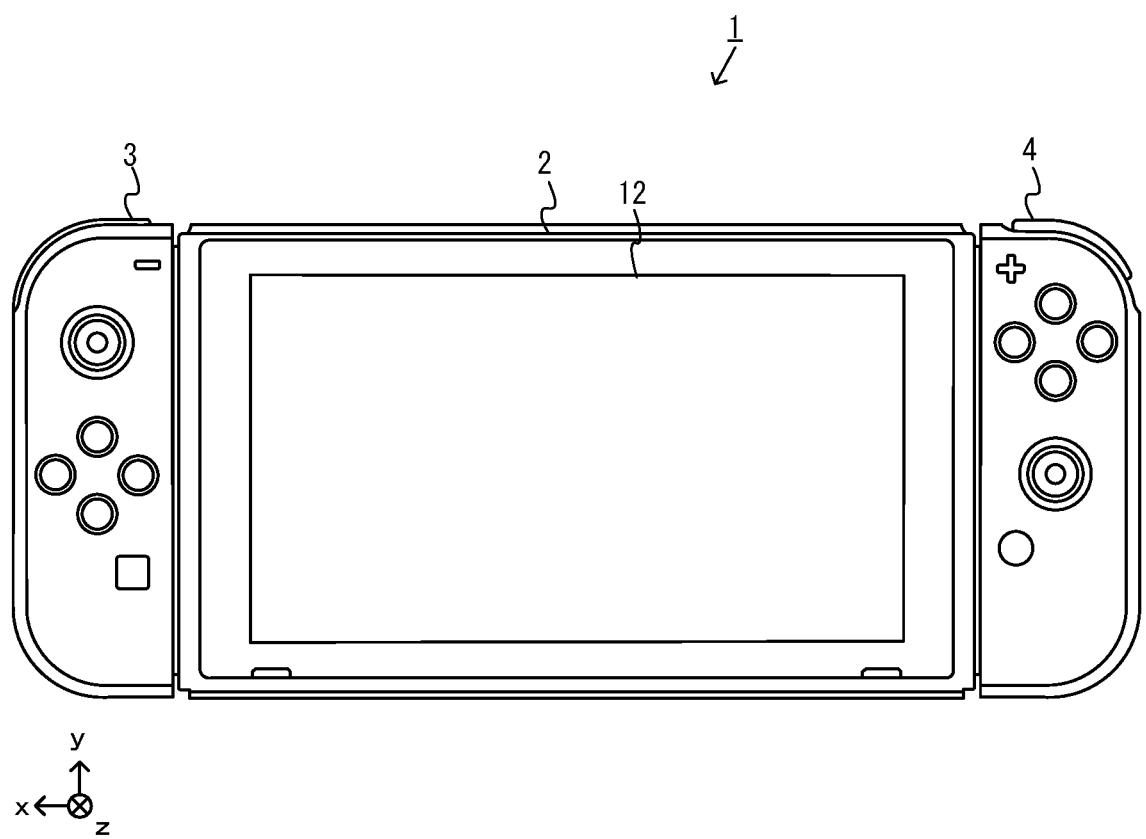
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
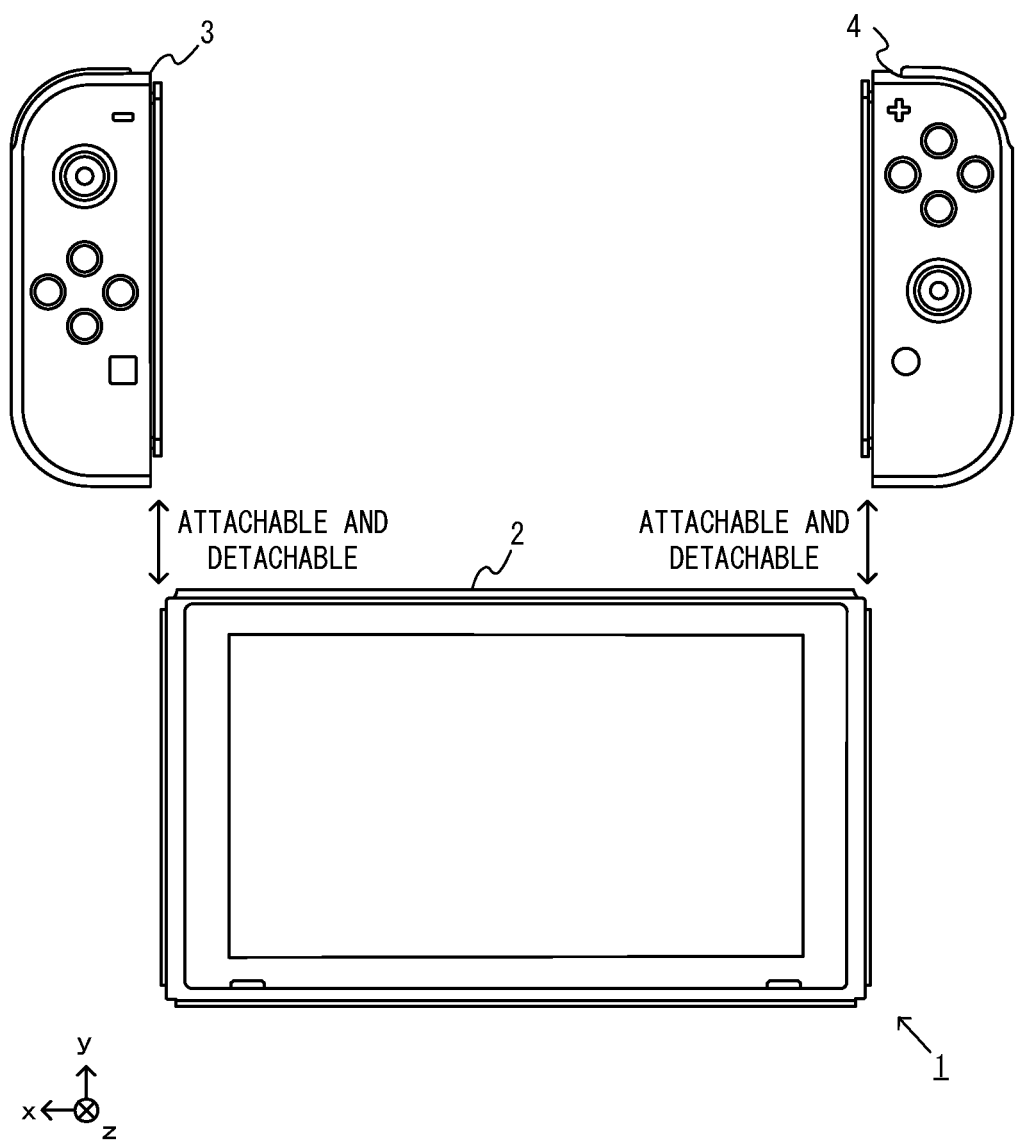
FIG. 2 is a diagram showing an example of a state where each of a non-limiting left controller and a non-limiting right controller is detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
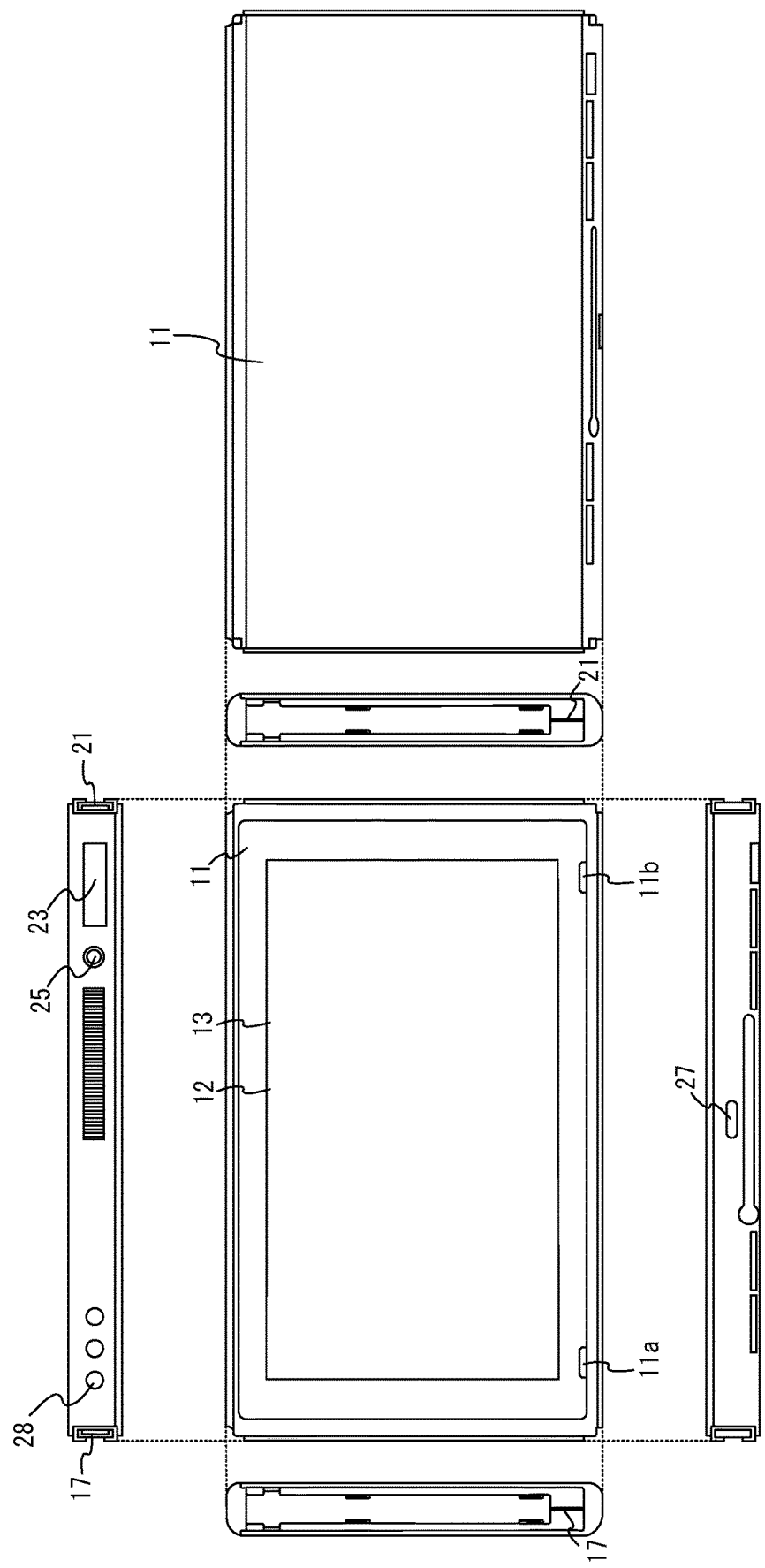
FIG. 3 is six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
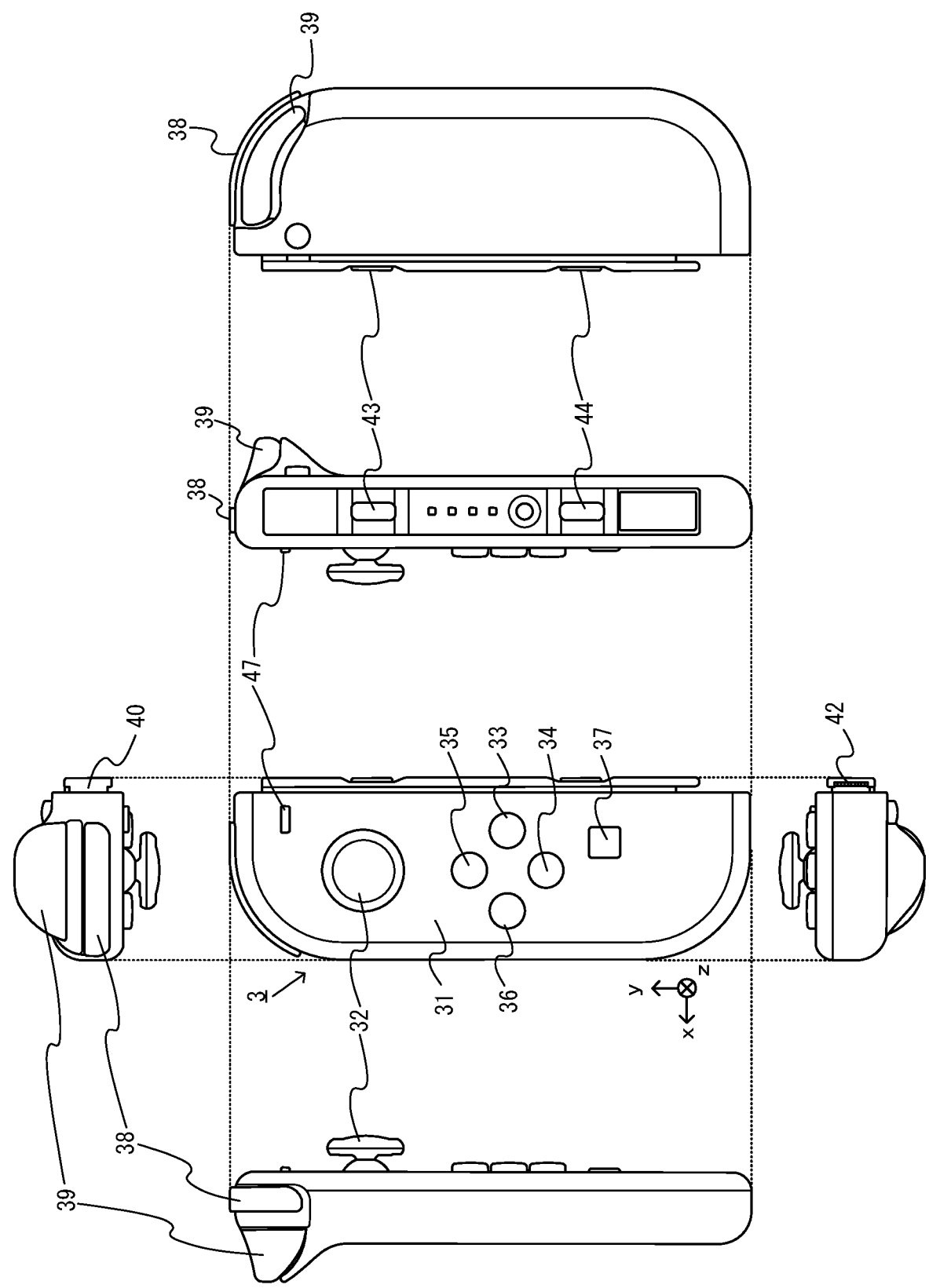
FIG. 4 is six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
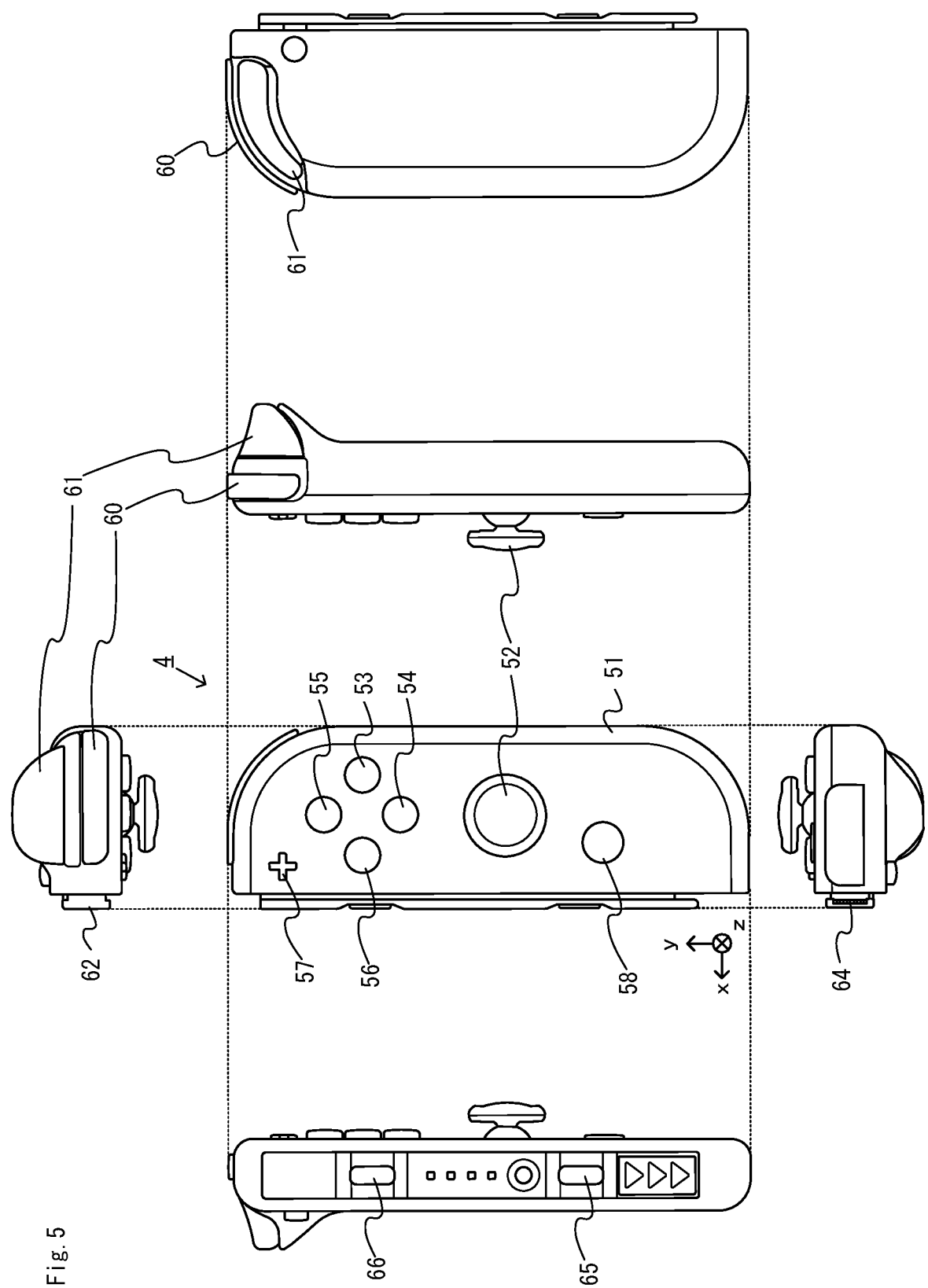
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
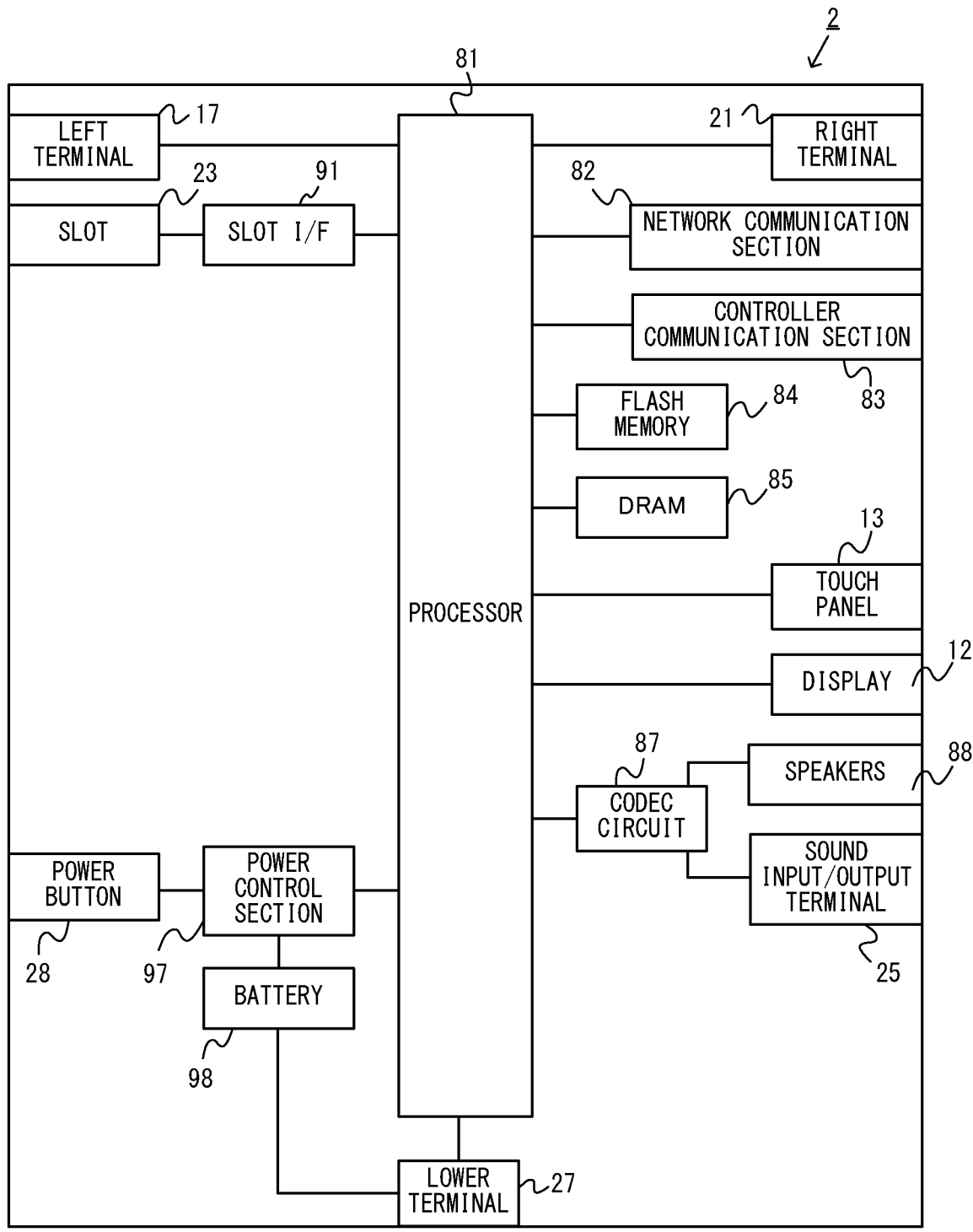
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 can also communicate with controllers different from the left controller 3 and the right controller 4. Therefore, the main body apparatus 2 can allow multiple users to play a game using a plurality of sets of different controllers.

Further, the display 12 is connected to the processor 81. The processor 81 causes the display 12 to display a generated image (e.g., an image generated by executing the above information processing) and/or an externally acquired image.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
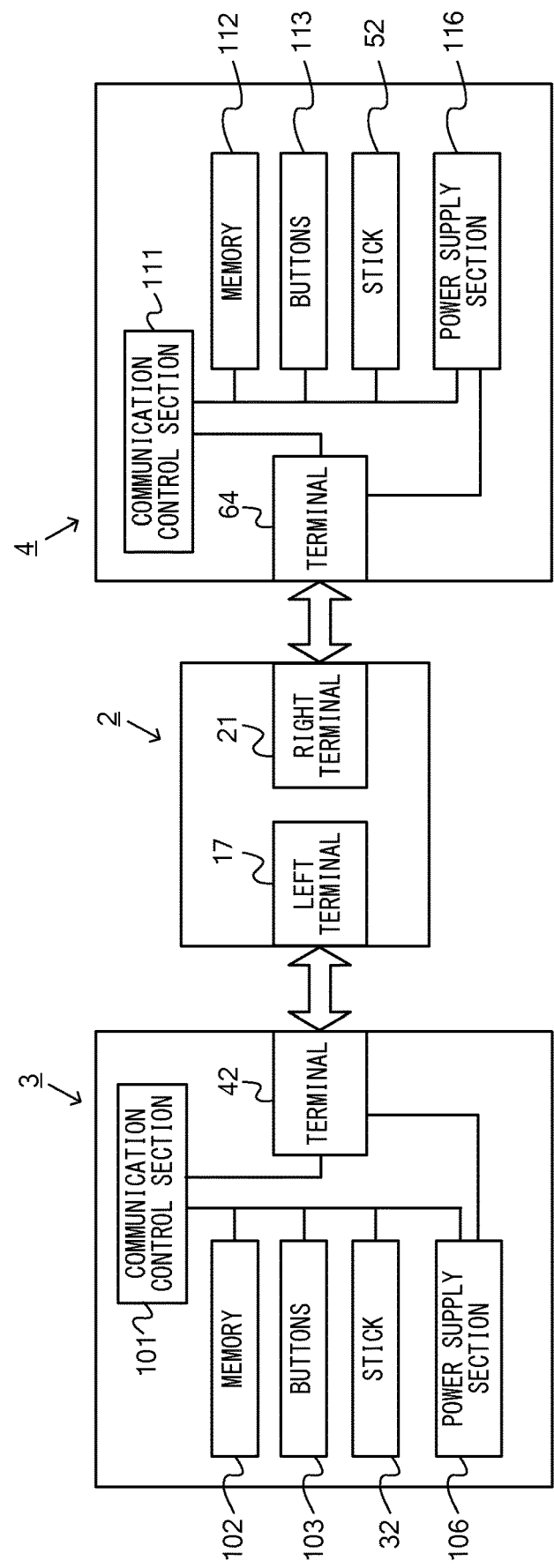
FIG. 7 is a block diagram showing examples of internal configurations of a non-limiting main body apparatus, a non-limiting left controller, and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes at least the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 106. In the exemplary embodiment, the power supply section 106 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes at least buttons 113 and the analog stick 52. These input sections have functions similar to those of the input sections of the left controller 3 and operate similarly to the input sections of the left controller 3.

The right controller 4 includes a power supply section 116. The power supply section 116 has a function similar to that of the power supply section 106 of the left controller 3 and operates similarly to the power supply section 106.

2. Overview of Processing in Game System

An information process executed in the game system 1 will be outlined with reference to FIGS. 8-16. In the exemplary embodiment, in the game system 1, an information process for a game with competition is executed. In the game with competition, a plurality of characters appear and compete with each other. Note that in the exemplary embodiment, it is assumed that a player operates a player character to compete with an opponent character that is controlled by the game system 1. In the exemplary embodiment, the kind (in other words, genre) of the game with competition is assumed to be a fighting game. The game with competition may be of any suitable kind, such as a puzzle game or an action game. The number of players that are allowed to participate in the game with competition may be any number that is greater than or equal to two.

[2-1. Characters Used in Game]

Figure 8:
FIG. 8 is a diagram showing an example of a relationship between kinds of characters used in a non-limiting game with competition.

The kinds of characters used in the game with competition will be described with reference to FIG. 8. FIG. 8 is a diagram showing an example of a relationship between kinds of characters used in the game with competition. As show in FIG. 8, in the exemplary embodiment, three kinds of characters, an operational character, an additional character, and an auxiliary character, are used. In the exemplary embodiment, for each of the three character kinds, a plurality of characters are prepared. Note that additional characters and auxiliary characters are hereinafter collectively referred to as "sub-characters."

The operational character 201 is actually controlled by a player in the game with competition. The sub-character is added to the operational character. A sub-character added to an operational character changes the performance of that operational character (e.g., the performance of the operational character is enhanced or a type is given to the operational character). In other words, in the exemplary embodiment, a player adds a sub-character to an operational character to enhance the operational character in the game with competition. In the exemplary embodiment, the game system 1 provides a sub-character that can be added to an operational character, resulting in an improvement in the strategic aspect of the game with competition.

In the exemplary embodiment, sub-characters include two kinds of characters, additional characters and auxiliary characters. As shown in FIG. 8, the additional character 202 can be directly added to the operational character 201. Note that in the exemplary embodiment, it is assumed that only one additional character can be added to an operational character. Alternatively, in another exemplary embodiment, two or more additional characters may be allowed to be added to an operational character. The auxiliary characters 203 and 204 can be combined with the additional character 202. Thus, while the additional character 202 can be directly added to the operational character 201, the auxiliary characters 203 and 204 can be indirectly added to the operational character 201.

(Information Set for Additional Character)

In the exemplary embodiment, each additional character used in the game with competition is associated with the following pieces of information.

Name
Image representing the additional character
Additional effect
Overall power
Type
Group
Slot capacity
Experience point
Level Note that in another exemplary embodiment, each additional character may be associated with other information in addition to the above pieces of information, or may not be associated with a portion of the above pieces of information.

The additional-effect information indicates an effect that is given to the performance of an operational character if an additional character is added to the operational character. In the exemplary embodiment, for each additional character, an offensive power parameter for increasing the offensive power of an operational character and a defensive power parameter for increasing the defensive power of an operational character are set as the additional-effect information. Note that the additional-effect information is not limited to the above parameters, and may be other information. For example, for each additional character, skill information of a skill to be given to an operational character may be set as the additional-effect information.

The above type information indicates a type that is given to an operational character if an additional character is added to the operational character. In the exemplary embodiment, the type information indicates one of three types A-C having a trilemma relationship and a type D without advantage and disadvantage in relation to the three types A-C. Note that the type A is advantageous over the type B, the type B is advantageous over the type C, and the type C is advantageous over the type A. As described in detail below, if the type of a first operational character is advantageous over the type of a second operational character, the offense of the first operational character can cause a greater damage to the second operational character in the game with competition than if the first operational character does not have such an advantageous type. In this case, the first operational character may be less damaged by the offense of the second operational character than if the first operational character does not have such an advantageous type. Note that in another exemplary embodiment, the type is not limited to the above four types. For example, the number of types may not be limited, and a type without advantage and disadvantage in relation to the other type may not be included.

The overall power is an index indicating the overall strength of an effect that is given by an additional character. For example, the overall power has a value that is determined based on an additional effect (specifically, offensive power and defensive power) given by an additional character. The overall power is used by a player for roughly determining the strength of an additional character.

The group information indicates a group to which an additional character belongs. Here, in the exemplary embodiment, operational characters and sub-characters are each divided into one or more groups. Note that operational characters or sub-characters may be divided in any suitable manner. For example, when a character appearing in another game application (i.e., a game application different from the game application of the game with competition) is used as an operational character in the game with competition, characters may be divided into groups according to game applications (or series of game applications) in which characters appear.

Note that in the exemplary embodiment, groups of operational characters and groups of sub-characters are managed as different kinds of groups because operational characters and sub-characters are different kinds of characters. Each group of operational characters is associated with one of the groups of sub-characters. The groups of operational characters may be associated with the groups of sub-characters in any suitable manner. For example, a group of operational characters is associated with a group of sub-characters that appear in the same game application in which those operational characters appear (note that a group of operational characters and an associated group of sub-characters can be said to be substantially the same group). As described in detail below, in the exemplary embodiment, in the case where the group of an operational character is associated with the group of a sub-character added to the operational character, the performance of the operational character is further enhanced than if the group of the operational character is not associated with the group of the sub-character.

The slot capacity information indicates a capacity in which an auxiliary character or characters can be combined with an additional character, i.e. the maximum amount of an auxiliary character or characters that can be combined with an additional character. The number of slots is described in detail below.

The experience point information indicates a current experience point of an additional character. The level information indicates a current level of a sub-character. Here, in the game with competition, if the experience point of an additional character has reached a predetermined value, the level of the additional character is increased by one. When the level is increased, the additional-effect information is updated such that a greater effect is given to an operational character.

(Information Set for Auxiliary Character)

In the exemplary embodiment, each auxiliary character used in the game with competition is associated with the following pieces of information.

Name

Image representing the auxiliary character

Additional effect

Group

Number of slots to be occupied

Note that in another exemplary embodiment, each auxiliary character may be associated with other information in addition to the above pieces of information, or may not be associated with a portion of the above pieces of information. For example, each auxiliary character may be associated with information similar to those for additional characters.

The additional-effect information indicates an effect that is given to an operational character to which an additional character is added if an auxiliary character is combined with the additional character. In other words, more effects can be given to an operational character by combining an auxiliary character with an additional character in addition to simply adding the additional character to the operational character.

In the exemplary embodiment, an additional effect set for an auxiliary character is a skill that is given to an operational character. The skill may be any suitable effect, such as the effect of enhancing the power of a punch or the effect of using a specific item. Note that additional characters and auxiliary characters may have either the same or different additional effects (e.g., additional characters and auxiliary characters may both give the effect of increasing offensive power).

The number-of-slots-to-be-occupied information indicates the capacity (i.e., the slot capacity) of an additional character that is occupied when an auxiliary character is combined with the additional character. In the exemplary embodiment, one or more auxiliary characters can be combined with an additional character, provided that the sum of the numbers of slots occupied by the auxiliary characters is smaller than or equal to the set slot capacity of the additional character. For example, as shown in FIG. 8, if the slot capacity of the additional character 202 is "3," the number of slots to be occupied by the auxiliary character 203 is "1," and the number of slots to be occupied by the auxiliary character 204 is "2," the two auxiliary characters 203 and 204 can simultaneously be combined with the additional character 202. Although not shown, three auxiliary characters for each of which the number of slots to be occupied is "1" can simultaneously be combined with the additional character 202 having a slot capacity of "3." Although, in the exemplary embodiment, different numbers of slots are to be occupied by different auxiliary characters, the same number of slots may be occupied by each auxiliary character in another exemplary embodiment.

As described above, in the exemplary embodiment, a sub-character can be added to an operational character used in the game with competition. A player can select a combination of an operational character and a sub-character(s). Therefore, the strategic aspect of the game with competition can be further improved than when an operational character is simply selected. In addition, in the exemplary embodiment, two kinds of characters, additional characters and auxiliary characters, are used as sub-characters. Therefore, an increased variety of combinations of characters can be added to an operational character, resulting in a further improvement in strategic aspect.

[2-2. Flow of Acquisition Game Mode]

Figure 9:
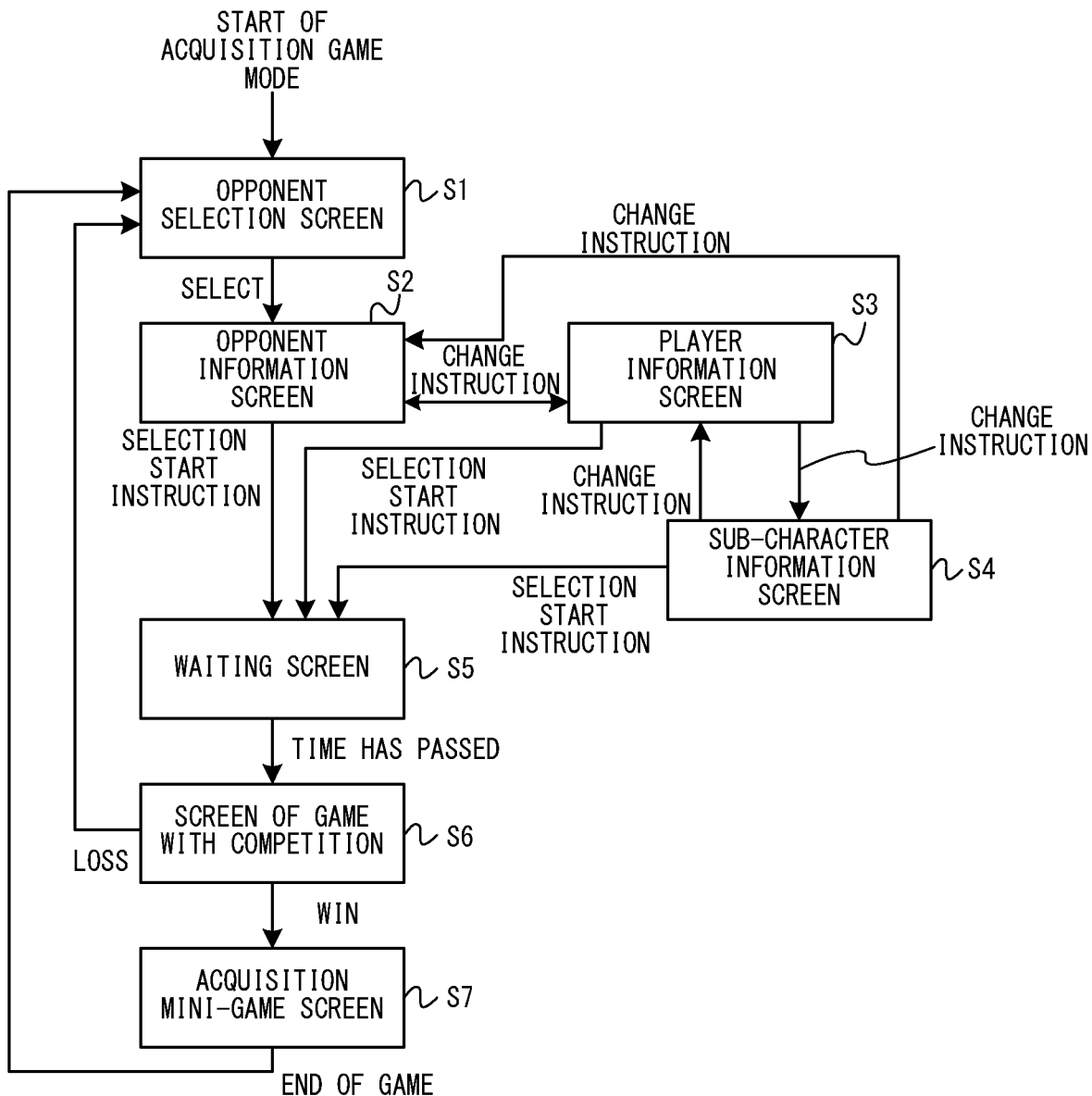
FIG. 9 is a state transition diagram showing an example flow of a process in a non-limiting acquisition game mode.

An acquisition game mode in which a player can acquire a sub-character will be outlined with reference to FIG. 9. In the exemplary embodiment, a game application for the game with competition has an acquisition game mode. In the acquisition game mode, a player plays a game with competition with a specified sub-character (in other words, an opponent character to which the sub-character is added). If a condition described below is satisfied, the sub-character is given to the player. As a result, the player can play the game with competition using the acquired sub-character (i.e., the sub-character is added to the operational character). A flow of the acquisition game mode will now be described.

FIG. 9 is a state transition diagram showing an example flow of a process in the acquisition game mode. As shown in FIG. 9, at the start of the acquisition game mode, the game system 1 initially displays an opponent selection screen on the display device (step S1). As described in detail below, the opponent selection screen is an image of a list of candidates for a sub-character to be selected (see FIG. 10). The opponent selection screen is a user interface with which a player specifies a sub-character that the player desires to acquire (in other words, a sub-character with which the player desires to compete) from those sub-characters. When the opponent selection screen is being displayed, a player can select one from a plurality of sub-characters displayed in the opponent selection screen. The game system 1 causes the selected sub-character to compete with the player. A sub-character selected as an opponent is hereinafter referred to as an "opponent sub-character." When an opponent sub-character is selected, the game system 1 changes the display of the display device from the opponent selection screen to an opponent information screen.

Following the display of the opponent selection screen, the game system 1 displays the opponent information screen on the display device (step S2). As described in detail below, the opponent information screen is an image of information about the selected opponent sub-character and the opponent character (see FIG. 11). Note that the term "opponent character" refers to an operational character that competes with a player character in the game with competition, and to which an opponent sub-character is added. By viewing the opponent information screen, a player can know information about the opponent character and the opponent sub-character. In addition, when the opponent information screen is being displayed, a player can give a start instruction to start the game with competition. In this situation, a player can also give a change instruction to change the display of the display device to the player information screen.

When the change instruction is given, the game system 1 displays the player information screen on the display device (step S3). As described in detail below, the player information screen is an image of information about a player character operated by a player and a sub-character added to the player character (see FIG. 13). Note that the term "player character" refers to an operational character that is operated by a player in the game with competition. A sub-character added to a player character is hereinafter referred to as an "own sub-character." In the exemplary embodiment, in the player information screen, a player can select a player character that is to be used in the game with competition. In addition, as in the opponent information screen, a player can give a start instruction to start the game with competition when the player information screen is being displayed. Furthermore, when the player information screen is being displayed, a player can give a change instruction to change the display of the display device to a sub-character information screen, and a change instruction to change the display of the display device to the opponent information screen (see step S2).

When the change instruction to change the display of the display device to the sub-character information screen is given, the game system 1 displays the sub-character information screen on the display device (step S4). As described in detail below, the sub-character information screen is an image of information about a sub-character used by a player (see FIG. 14). In the exemplary embodiment, in the player information screen, a player can select a sub-character that is to be used in the game with competition. In addition, as in the opponent information screen and the player information screen, a play can give a start instruction to start the game with competition when the sub-character information screen is being displayed. Furthermore, when the sub-character information screen is being displayed, a player can give a change instruction to change the display of the display device to the player information screen (step S3), and a change instruction to change the display of the display device to the opponent information screen (step S2).

Meanwhile, when the start instruction is given in the opponent information screen, the player information screen, or the sub-character information screen, the game system 1 displays a waiting screen on the display device (step S5). The waiting screen is an image that is displayed until the start of the game with competition (e.g., until the game system 1 is ready to start the process of the game with competition). As described in detail below, the waiting screen shows information about characters (i.e., a player character and an opponent character) that compete with each other in the game with competition, and a sub-character added to each character (i.e., an own sub-character and an opponent sub-character) (see FIG. 15). In the exemplary embodiment, the waiting screen is displayed for a predetermined display time, and thereafter, a screen for the game with competition is displayed automatically (i.e., without a player's instruction).

After the waiting screen is displayed, the game system 1 displays the screen for the game with competition on the display device (step S6). The screen for the game with competition contains an image of a virtual game space in which a player character and an opponent character that compete with each other appear (see FIG. 16). As described in detail below, the screen for the game with competition also contains icons indicating a player character and an own sub-character, and icons indicating an opponent character and an opponent sub-character.

In the exemplary embodiment, the game with competition is over if a player character has defeated or has been defeated by an opponent character. If a player character has won, the game system 1 displays an acquisition mini-game screen described below on the display device (step S7). Meanwhile, if a player character has lost, the acquisition mini-game screen is not displayed, and the display of the display device is returned to the opponent selection screen (step S1).

The acquisition mini-game screen is a game image for an acquisition mini-game for acquiring an opponent sub-character used in the game with competition. The acquisition mini-game may be any suitable game. For example, the acquisition mini-game is a game in which a roulette is spun. In the exemplary embodiment, if a player has won the acquisition mini-game, an opponent sub-character is given to the player, and thereafter, the player can use the opponent sub-character as an own sub-character. Meanwhile, if a player has lost the acquisition mini-game, an opponent sub-character is not given to the player. After the acquisition mini-game is over, the display of the display device is returned to the opponent selection screen (step S1).

As described above, in the exemplary embodiment, a condition under which a sub-character is given to a player is that the player wins both the game with competition and the acquisition mini-game. Note that a sub-character is given to a player under any suitable condition, or any condition that is related to a game result. For example, in another exemplary embodiment, the condition under which a sub-character is given to a player is that the player wins the game with competition. In this case, the game system 1 may not execute a game process for the acquisition mini-game.

As described above, in the acquisition game mode, a player initially selects an opponent sub-character in the opponent selection screen (step S1), and checks the contents of the opponent information screen (step S2). Thereafter, the player selects a player character in a player character information screen (step S3), and selects an own sub-character in the sub-character information screen (step S4). Thereafter, the player gives the start instruction and plays the game with competition (step S6). If the player wins the acquisition mini-game (step S7), the player can acquire the opponent sub-character. In the exemplary embodiment, the acquisition game mode proceeds according to the above flow.

[2-3. Specific Example of Game Screen]

Next, specific example game screens displayed in the acquisition game mode will be described. Note that in the exemplary embodiment, a display device that displays the game screen images may be either the display 12 or a stationary monitor.

(Opponent Selection Screen)

Figure 10:
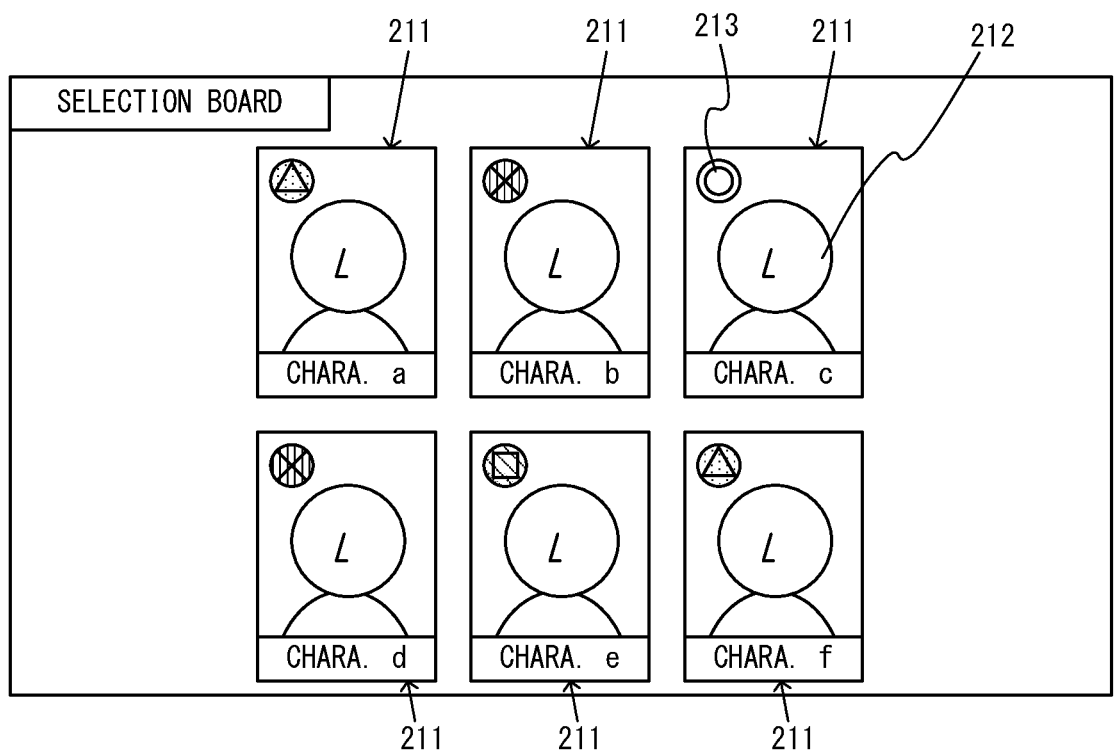
FIG. 10 is a diagram showing an example of a non-limiting opponent selection screen.

FIG. 10 is a diagram showing an example of the opponent selection screen. As shown in FIG. 10, the opponent selection screen is an image of a plurality of candidates for a sub-character to be selected. Specifically, the opponent selection screen contains a predetermined number of (here, six) sub-character regions 211 that are being shown. The sub-character regions 211 each display information about a sub-character. Note that in the exemplary embodiment, the game system 1 prepares a greater number of sub-characters than those being shown. Some of the prepared sub-characters are selected, and information about the selected sub-characters is displayed in the respective sub-character regions 211 of the opponent selection screen. Note that in the exemplary embodiment, both an additional character and an auxiliary character may be selected as a selection candidate.

Note that a sub-character may be selected using any suitable method. For example, a sub-character may be randomly selected. The game system 1 may select a sub-character at any suitable timing. For example, the game system 1 may select a sub-character each time the opponent selection screen is displayed, or may select a sub-character at regular intervals. Alternatively, sub-characters displayed in the opponent selection screen may be changed (in other words, reselected) in response to a player's use of a predetermined item. Alternatively, in another exemplary embodiment, all sub-characters may be shown at once in the opponent selection screen.

As shown in FIG. 10, the sub-character region 211 contains, as images showing a sub-character, a sub-character image (e.g., an image 212) showing the sub-character, and an image of a name of the sub-character (e.g., "Chara. c" shown in FIG. 10). The sub-character region 211 also contains a type mark (e.g., an image 213) indicating a type of the sub-character.

In the opponent selection screen, a player selects a sub-character that is to compete in the game with competition by an input for activating one of the sub-character regions 211. Note that in the exemplary embodiment, an element (i.e., an image or a region) displayed on the screen of the display device may be activated in any suitable manner. For example, an element may be activated by performing an input on the touch panel 13 or by performing a button input on a controller with a cursor pointing the element on the screen.

As described above, in the opponent selection screen, an image of a sub-character, and an image of a type of the sub-character, are displayed. Therefore, a player can select a sub-character with which the player desires to compete (in other words, the player desires to acquire) with reference to these images. Note that in another exemplary embodiment, another piece of information about a sub-character may be displayed in the sub-character region 211. For example, in another exemplary embodiment, the sub-character region 211 may contain information about an additional effect, overall power, and/or group of a sub-character. In addition, in the case where rarity is associated with a sub-character, information about the rarity may be contained in the sub-character region 211.

(Opponent Information Screen)

Figure 11:
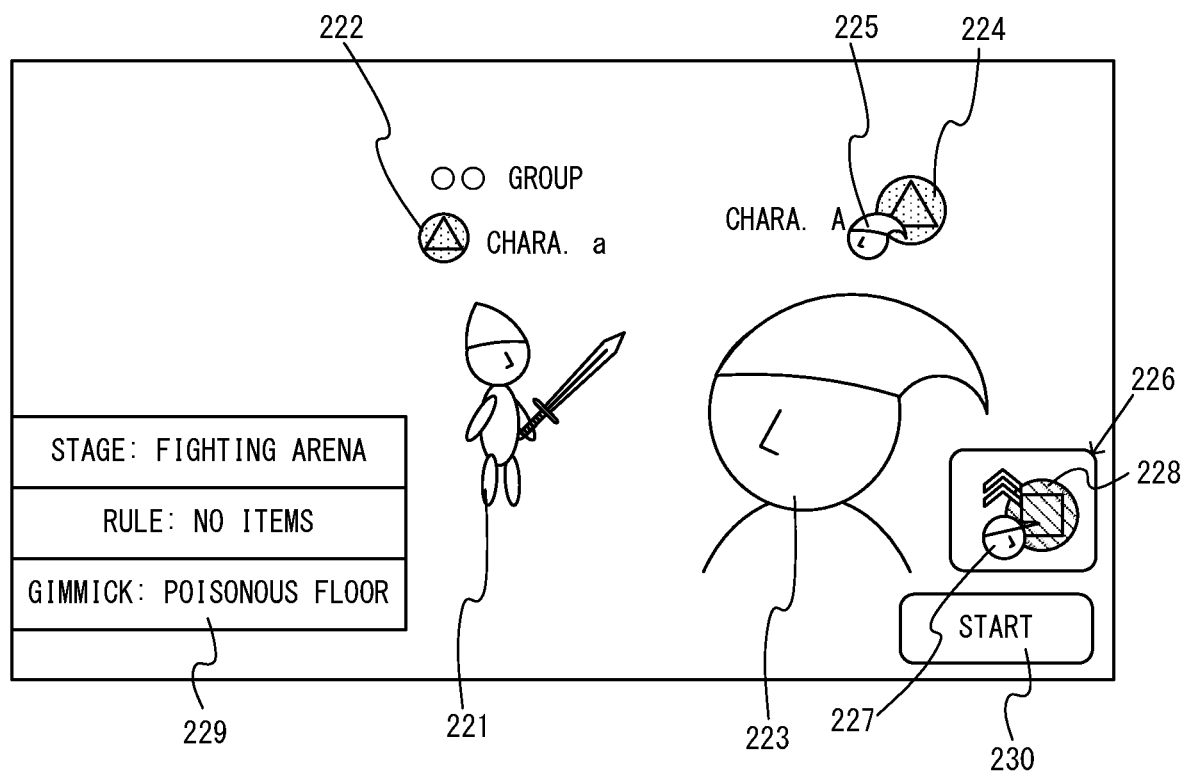
FIG. 11 is a diagram showing an example of a non-limiting opponent information screen.

FIG. 11 is a diagram showing an example of the opponent information screen. The opponent information screen shows information about an opponent sub-character selected in the opponent selection screen, and an opponent character to which the opponent sub-character is added.

As shown in FIG. 11, the opponent information screen contains, as information about an opponent sub-character, a name ("Chara. a" in FIG. 11) and an image 221 showing the opponent sub-character. The opponent information screen also contains an opponent type icon 222 indicating a type of the opponent sub-character. Note that in the exemplary embodiment, the opponent information screen contains information about a group to which the opponent sub-character belongs ("∘∘ group" in FIG. 11). In another exemplary embodiment, the opponent information screen may contain, as information about the opponent sub-character, information about an additional effect and/or rarity of the opponent sub-character. The opponent information screen may also contain information of whether or not the opponent sub-character has already been acquired by a player.

Here, the opponent sub-character may be an additional character for which a type is set or an auxiliary character for which a type is not set. Specifically, the game system 1 selects an additional character or an auxiliary character as an opponent sub-character. When an additional character is selected as an opponent sub-character, the game system 1 sets the type of the additional character as a type of the opponent sub-character. Meanwhile, when an auxiliary character for which a type is not set is selected as an opponent sub-character, the game system 1 sets a preset type as a type of the opponent sub-character. Note that a type set for an auxiliary character is temporarily set in each play of the game with competition. This setting of a type to an auxiliary character is referred to as "provisional setting." Note that any suitable type may be provisionally set for an auxiliary character. For example, a type may be previously determined for each auxiliary character. As described above, the provisional setting of a type to an auxiliary character can improve the strategic aspect of the game with competition even when an auxiliary character is selected.

Note that in the exemplary embodiment, it is not possible to add only an auxiliary character to a player character to which an additional character is not added. Note that if the opponent sub-character is an auxiliary character (i.e., an auxiliary character has been selected in the opponent selection screen), the game system 1 permits addition of an auxiliary character to an opponent character to which an additional character is not added. As a result, the game system 1 can handle an additional character and an auxiliary character as an opponent sub-character in the same manner in the acquisition game mode, and can use an additional character as well as an auxiliary character as a sub-character that is given in the acquisition game mode.

As shown in FIG. 11, the opponent information screen contains, as information of an opponent character, a name ("Chara. A" in FIG. 11) and an image 223 showing the opponent character. The opponent information screen also contains an opponent type icon 224 indicating a type of the opponent character. Here, a type of the opponent character is a type of an opponent sub-character that is added to the opponent character. Therefore, the type indicated by the opponent type icon 224 is the same as the type indicated by the opponent type icon 222 associated with the opponent sub-character (see FIG. 11). The opponent type icon 224 is also displayed in association with an opponent icon 225 that is an icon image of the opponent character. In the exemplary embodiment, the opponent icon 225 is an image of a face of the opponent character. Note that in another exemplary embodiment, the opponent information screen may contain, as information about an opponent character, information about the performance and/or group of the opponent character.

Here, in the exemplary embodiment, an opponent character to which an opponent sub-character selected in the opponent selection screen is to be added is determined by the game system 1 according to a predetermined rule. The game system 1, when displaying the opponent information screen after an opponent sub-character is selected in the opponent selection screen, determines an opponent character to which the opponent sub-character is to be added. For example, in the exemplary embodiment, for each opponent sub-character, an opponent character to which the opponent sub-character is to be added is previously determined. Note that such an opponent character may be determined according to any suitable rule. Such an opponent character may be randomly determined or may be selected by a player.

As shown in FIG. 11, in the exemplary embodiment, the image 223 showing an opponent character is larger than the image 221 showing an opponent sub-character. Therefore, in the opponent information screen, a relationship between each character (i.e., a relationship between an opponent character and an opponent sub-character added to the opponent character) can be easily understood by a player.

As shown in FIG. 11, the opponent information screen contains a player information region 226. The player information region 226 displays information about a selected player character and an own sub-character. Note that in the opponent information screen of FIG. 11, a situation is shown in which a player character and an own sub-character have been selected. Although not shown, if a player character and an own sub-character have not been selected when the opponent information screen is displayed, the player information region 226 contains information indicating that a player character and an own sub-character have not been selected.

As shown in FIG. 11, the player information region 226 contains an own icon 227 and an own type icon 228. The own icon 227 is an icon image of a selected player character. Specifically, the own icon 227 is an image of a face of a selected player character. The own type icon 228 is an icon image of a type of a selected own sub-character (in other words, a type of a player character to which the own sub-character is added).

Figure 12:
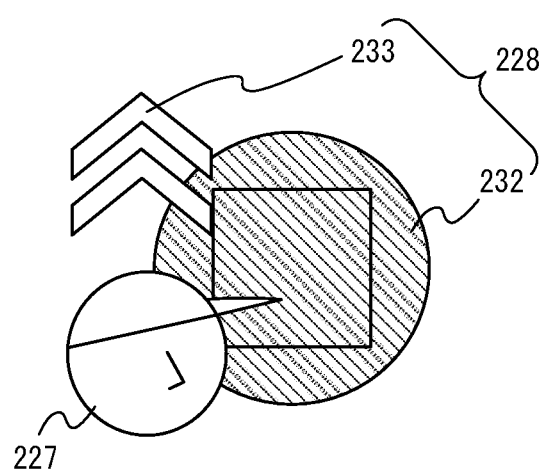
FIG. 12 is a diagram showing an example of an own icon and an own type icon shown in FIG. 11.

FIG. 12 is a diagram showing an example of the own icon and the own type icon of FIG. 11. As shown in FIG. 12, the own type icon 228 contains a type image 232 and an advantage and disadvantage image 233. The type image 232 shows a type of a selected own sub-character. The advantage and disadvantage image 233 shows advantage and disadvantage between the type of the selected own sub-character and the type of a selected opponent sub-character. The advantage and disadvantage image 233 is displayed in one of forms including at least a first form indicating an advantage and a second form indicating a disadvantage (note that the first and second forms are different from each other). In the exemplary embodiment, the first form indicating an advantage is an upward arrow (see FIG. 12), and the second form indicating a disadvantage is a downward arrow (see an opponent type icon 254 in FIG. 13). As described above, by showing the advantage and disadvantage image 233, the game system 1 allows a player to easily know which of the type of a currently selected own sub-character and the type of a selected opponent sub-character is advantageous or disadvantageous in relation to the other.

In the exemplary embodiment, if the advantage and disadvantage are such that the type of a currently selected own sub-character and the type of a selected opponent sub-character are neither advantageous nor disadvantageous in relation to each other, i.e., are level with each other, the own type icon 228 does not contain the advantage and disadvantage image 233 (i.e., only the type image 232 is displayed). Note that in another exemplary embodiment, in the above situation, the own type icon 228 may contain a type image having a third form indicating that the advantage and disadvantage are such that the type of a currently selected own sub-character and the type of a selected opponent sub-character are neither advantageous nor disadvantageous in relation to each other, i.e., are level with each other (note that the third display form is different from the first and second display forms). The third display form may, for example, be "=." Thus, by showing the own type icon 228, the game system 1 allows a player to easily understand that the type of a currently selected own sub-character and the type of a selected opponent sub-character are neither advantageous nor disadvantageous in relation to each other, i.e., are level with each other.

In the exemplary embodiment, the advantage and disadvantage image 233 is displayed, overlaying the type image 232, i.e., being closer to a player than is the type image 232 (see FIG. 12). This allows a player to easily understand a correspondence between the type image 232 and the advantage and disadvantage image 233. More specifically, the advantage and disadvantage image 233 is disposed, overlapping the type image 232 (in FIG. 12, the advantage and disadvantage image 233 is positioned on top of an upper left portion of the type image 232). This allows a player to easily see both the type image 232 and the advantage and disadvantage image 233.

In the exemplary embodiment, the type image 232 is larger than the advantage and disadvantage image 233 (see FIG. 12). Therefore, even when the advantage and disadvantage image 233 is positioned closer to a player than is the type image 232, the possibility that it is difficult to see the type image 232 can be reduced.

In the exemplary embodiment, the type image 232 has a color that represents the kind of a type (note that different colors are represented by different hatchings in the drawings). This allows a player to easily identify the kind of a type even when the advantage and disadvantage image 233 (or the own icon 227 described below) is positioned closer to a player, so that a portion of the type image 232 is hidden.

As shown in FIG. 12, in the exemplary embodiment, the own icon 227 is displayed in association with the own type icon 228. Specifically, the own icon 227 is displayed, overlaying the own type icon 228, i.e., being closer to a player than is the own type icon 228. This allows a player to easily understand a correspondence between the own icon 227 and the own type icon 228. More specifically, the own icon 227 is positioned, overlapping the own type icon 228

(in FIG. 12, the own icon 227 is positioned on top of a lower left portion of the own type icon 228). This allows a player to easily see both the own icon 227 and the own type icon 228.

Note that in the exemplary embodiment, the own icon 227 is displayed, overlaying the own type icon 228, and therefore, it can be said that the own icon 227 and the own type icon 228 form a single icon.

In the exemplary embodiment, the own type icon 228 is larger than the own icon 227 (see FIG. 12). Therefore, even when the own icon 227 is positioned closer to a player than is the own type icon 228, the possibility that it is difficult to see the own type icon 228 can be reduced. Note that the own icon 227 is disposed, overlaying the type image 232 of the own type icon 228, and not overlaying the advantage and disadvantage image 233. This can reduce the possibility that it is difficult to see the advantage and disadvantage image 233.

Referring back to FIG. 11, in the opponent information screen, a player can give a change instruction to change the display of the display device to the player information screen by an input for activating the player information region 226. Note that the change instruction may be input in any suitable manner, and may, for example, be input by pressing a predetermined button of a controller.

As shown in FIG. 11, the opponent information screen contains a game condition image 229 indicating a game condition related to the game with competition. Here, the game condition is, for example, a stage or rule of the game with competition, or a gimmick placed in the stage, etc. In the exemplary embodiment, a game condition is determined for each opponent sub-character selected in the opponent selection screen, i.e., different game conditions are provided for different opponent sub-characters. By displaying the game condition image 229, the game system 1 allows a player to recognize a game condition for the game with competition.

The opponent information screen also contains a start instruction image 230 that indicates a start instruction to start the game with competition. Specifically, a player can give the start instruction by an input for activating the start instruction image 230.

As described above, in the exemplary embodiment, the game system 1 generates an image of the opponent information screen showing an opponent character and an opponent sub-character added to the opponent character. Here, the image of the opponent information screen contains the opponent character image 223 showing an opponent character, the opponent sub-character image 221 showing an opponent sub-character, the own icon 227 showing a player character, and the own type icon 228 showing a type of a selected own sub-character (specifically, an additional character) (see FIG. 11). Therefore, in the opponent information screen, a player can easily understand information about an opponent's characters, and information about their own characters based on the icons 227 and 228. Therefore, a player can easily determine whether or not to start the game, by viewing the opponent information screen. A player can also determine whether to start the game or reselect a player character and an own sub-character, by comparing the player's information with an opponent's information. Therefore, the strategic aspect of character selection in the game with competition can be improved.

In the opponent information screen, the opponent sub-character image 221 is smaller than the opponent character image 223 and is larger than the own icon 227 (see FIG. 11). Therefore, by displaying the opponent information screen, the game system 1 can show a relationship between an opponent character and an opponent sub-character (i.e., which of two characters is an opponent character or an opponent sub-character) in an easy-to-understand manner. By displaying the own icon 227, the game system 1 allows a player to know their own player character, in such a form that the own icon 227 does not much interfere with the opponent sub-character image 221 or the opponent character image 223.

As used herein, the phrase "one image is larger than another image" may mean that one image is enlarged by a greater factor than that of another image, or that the area of the display region of one image is greater than that of another image. For example, in the exemplary embodiment, the opponent character image 223 is enlarged by a greater factor than that of the opponent sub-character image 221, and the area of the display region of the opponent character image 223 is greater than that of the opponent sub-character image 221. Note that when the opponent character image 223 is enlarged by a greater factor than that of the opponent sub-character image 221, it can be said that "the opponent character image 223 is larger than the opponent sub-character image 221." When the area of the display region of the opponent character image 223 is greater than that of the opponent sub-character image 221, it can also be said that "the opponent character image 223 is larger than the opponent sub-character image 221."

(Player Information Screen)

Figure 13:
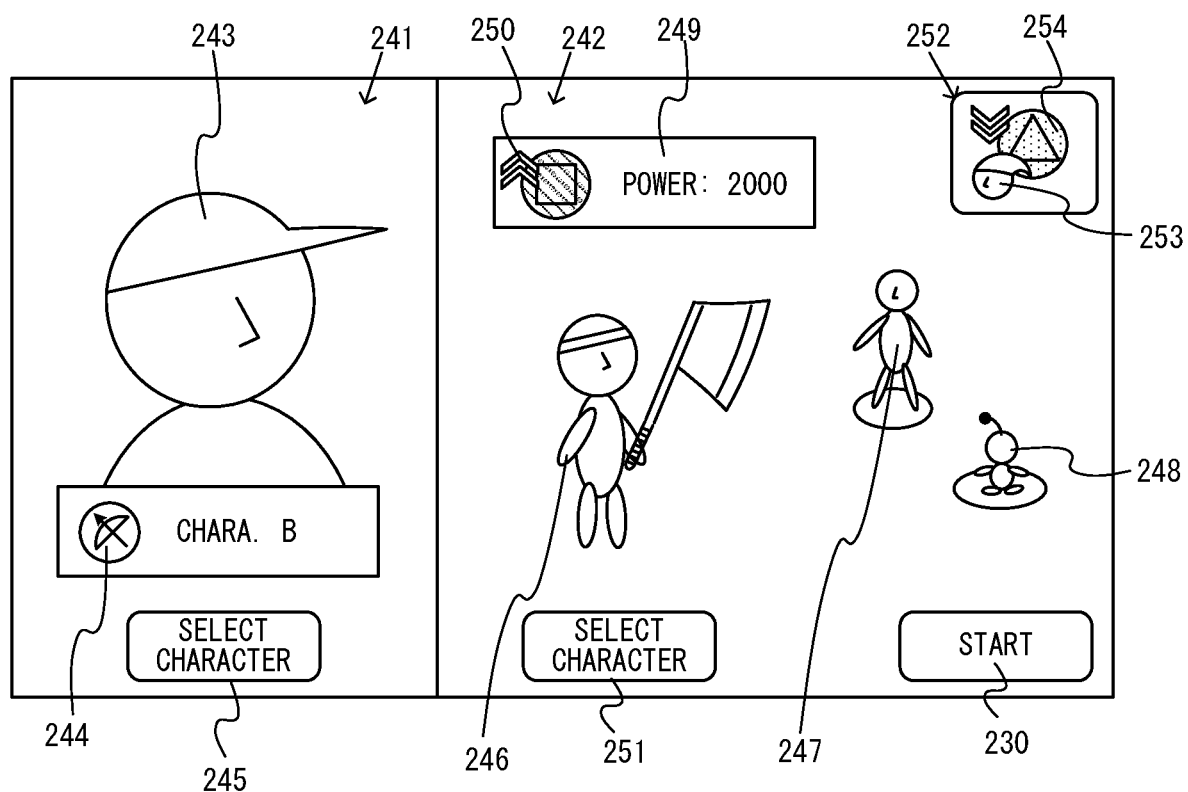
FIG. 13 is a diagram showing an example of a non-limiting player information screen.

FIG. 13 is a diagram showing an example of the player information screen. The player information screen shows information about characters (i.e., a player character and an own sub-character) selected by a player. As shown in FIG. 13, the player information screen includes a player character region 241 and a sub-character region 242. In the player character region 241, information about a selected player character is displayed. In the sub-character region 242, information about a selected own sub-character is displayed.

Note that the player information screen of FIG. 13 shows that a player character and an own sub-character have been selected. Although not shown, if a player character has not yet been selected when the player information screen is displayed, the player character region 241 contains information indicating that a player character has not been selected. Also, if an own sub-character has not yet been selected when the player information screen is displayed, the sub-character region 242 contains information indicating that an own sub-character has not been selected.

As shown in FIG. 13, in the player character region 241, as information about a player character, a name ("Chara. B" in FIG. 13) of the player character and an image 243 showing the player character are displayed. In the exemplary embodiment, a group icon 244 indicating a group to which the player character belongs is displayed in the player character region 241. Note that in another exemplary embodiment, the player information screen may contain, as information about a player character, information of the performance of the player character.

As shown in FIG. 13, the player character region 241 contains a player character selection image 245. The player character selection image 245 is an instruction image of a selection operation instruction to perform an operation of selecting a player character. Specifically, in order to select a player character, a player performs an input for activating the player character selection image 245. In response to the input for activating the player character selection image 245, the game system 1 executes a player character selection process. Specifically, the game system 1 initially displays, on the display device, a selection screen (not shown) containing a plurality of operational characters that are a candidate for a player character to be selected. For example, in the selection screen, a list of candidates for an operational character to be selected is displayed, together with pieces of information (a name, performance, etc.) about each operational character candidate. A player specifies and selects, as a player character, one operational character from the selection candidates contained in the selection screen. When a player character is selected in the selection screen, the game system 1 changes the display of the display device from the selection screen to the player information screen. After the screen changing, information about the selected player character is displayed in the player character region 241 of the player information screen (see FIG. 13). Note that even when information about a player character is being displayed in the player character region 241, a player is allowed to activate the player character selection image 245 and then select a different player character (in other words, reselect an additional character).

As shown in FIG. 13, in the sub-character region 242, images 246-248 showing selected own sub-characters are displayed as information about the own sub-characters. Note that in FIG. 13, the image 246 shows a selected additional character, the images 247 and 248 show selected auxiliary characters. As shown in FIG. 13, in the exemplary embodiment, the image 246 showing an additional character is larger than the images 247 and 248 showing auxiliary characters. The image 246 showing an additional character is also smaller than the image 243 showing a player character in the player character region 241. Such a size relationship between each displayed image allows a player to easily recognize a relationship between each character (i.e., an additional character is added to a player character, and an auxiliary character is combined with the additional character, see FIG. 8).

Note that in another exemplary embodiment, in the sub-character region 242, as information about an own sub-character, a name, additional effect, and/or group of the own sub-character may be displayed.

The sub-character region 242 also contains an additional effect region 249 (see FIG. 13). In the additional effect region 249, information about an effect that is to be given by a selected own sub-character to a player character is displayed. Specifically, in the additional effect region 249, an own type icon 250 indicating a type (i.e., a type of a selected additional character) given to a player character is displayed. The own type icon 250 contains the type image and the advantage and disadvantage image. In the additional effect region 249, information about the overall power is also displayed. The value of the overall power associated with an additional character may be directly displayed in the additional effect region 249. Alternatively, the value of the overall power of an additional character may be corrected based on an effect given by a selected auxiliary character, and the corrected value may be displayed. In another exemplary embodiment, in the additional effect region 249, information about an additional effect (e.g., offensive power and defensive power), group, slot capacity, and/or level of an additional character may also be displayed. In the additional effect region 249, information about an additional effect (e.g., a skill to be given), group, and/or number of slots to be occupied of an auxiliary character may also be displayed.

As described above, in the exemplary embodiment, in the additional effect region 249 of the player information screen, an effect that is to be given to a player character by an own sub-character is displayed. This allows a player to know the effect of a selected own sub-character. In the additional effect region 249, an own type icon containing an advantage and disadvantage image is also displayed. This allows a player to know the advantage and disadvantage between a selected own sub-character and an opponent sub-character. Thus, a player can easily select an own sub-character by viewing information displayed in the additional effect region 249. In the exemplary embodiment, in the player information screen, an index (i.e., overall power) based on the additional effect of an own sub-character is displayed. As a result, an easy-to-understand reference for selecting an own sub-character can be shown to a player, which allows the player to more easily select an own sub-character.

The sub-character region 242 also contains a sub-character selection image 251. The sub-character selection image 251 is an instruction image of a change instruction to change the display of the display device to the sub-character information screen for selecting a sub-character. Specifically, in order to select a sub-character, a player performs an input for activating the sub-character selection image 251. In response to the input for activating the sub-character selection image 251, the game system 1 displays the sub-character information screen on the display device. The sub-character information screen is described in detail below.

As shown in FIG. 13, the player information screen contains an opponent information region 252. In the opponent information region 252, information about an opponent character and an opponent sub-character is displayed. As shown in FIG. 13, the opponent information region 252 contains an opponent icon 253 and an opponent type icon 254. As with the opponent icon 225 (see FIG. 11), the opponent icon 253 indicates an opponent character. The opponent type icon 254 indicates a type of a selected opponent sub-character (in other words, a type of an opponent character to which the opponent sub-character is added).

As shown in FIG. 13, as with the own type icon 228 of FIG. 12, the opponent type icon 254 contains a type image and an advantage and disadvantage image. The type image shows a type of an opponent sub-character. The advantage and disadvantage image shows advantage and disadvantage between the type of a selected opponent sub-character and the type of a selected own sub-character. Note that the advantage and disadvantage image in the opponent type icon is similar to the advantage and disadvantage image in the own type icon. In addition, an arrangement of the type image and the advantage and disadvantage image in the opponent type icon is similar to that of the type image 232 and the advantage and disadvantage image 233 in the own type icon. In other words, while the own type icon 228 and the opponent type icon 254 are different from each other in that the former indicates a type of an own sub-character and the latter indicates a type of an opponent sub-character, these icons indicate a type of a sub-character in the same form.

As described above, in the exemplary embodiment, the own type icon and the opponent type icon contain, in addition to the type image of a type, the advantage and disadvantage image of advantage and disadvantage between the type of a selected own sub-character and the type of a selected opponent sub-character. As a result, the game system 1 can show, to a player, advantage and disadvantage between a player's character and an opponent's character in an easy-to-understand manner. In addition, a player can determine whether to start a game or reselect a player character and an own sub-character, by viewing the own type icon or the opponent type icon. Therefore, the strategic aspect of character selection in the game with competition can be improved.

As shown in FIG. 13, the opponent icon 253 is displayed in association with the opponent type icon 254. In the exemplary embodiment, a positional relationship between the opponent icon 253 and the opponent type icon 254 is similar to that of the own icon 227 and the own type icon 228 (see FIG. 12). In the exemplary embodiment, it can be said that the opponent icon 253 and the opponent type icon 254 form a single icon.

In the player information screen, a player can give a change instruction to change the display of the display device to the opponent information screen (FIG. 11) by an input for activating the opponent information region 252. Note that the change instruction may be input in any suitable manner, and may, for example, be input by pressing a predetermined button of a controller.

As with the opponent information screen, the player information screen contains a start instruction image 230 showing a start instruction to start the game with competition (see FIG. 13). Specifically, a player can also give the start instruction in the player information screen, as in the opponent information screen.

As described above, in the exemplary embodiment, if an operational input for giving an instruction to start the game with competition has been performed (i.e., the start instruction has been given) when the opponent information screen or the player information screen is displayed, the game system 1 executes a game with competition starting process of starting the game with competition. Specifically, a player can start the game with competition when viewing either the opponent information screen or the player information screen, resulting in an improvement in convenience of a player.

Note that in the exemplary embodiment, the game system 1 accepts the start instruction if a player character has been selected. For example, if a player character has been selected, the game system 1 may display the start image in each information screen (i.e., the opponent information screen, the player information screen, and the sub-character information screen described below). Thus, in the exemplary embodiment, a player can start the game with competition even when an additional character and an auxiliary character have not been selected. Note that a player can start the game with competition in a situation where a player character and an additional character have been selected (i.e., only an additional character(s) is added to a player character), and in a situation where a player character, an additional character, and an auxiliary character have been selected (i.e., an additional character combined with an auxiliary character is added to a player character).

As described above, in the exemplary embodiment, the game system 1 generates an image of the player information screen showing a player character, and an additional character that has been selected as an own additional character added to the player character according to an operational input (see FIG. 13). Here, the image of the player information screen contains the player character image 243 showing a player character, the own additional character image 246 showing a selected own additional character, the own type icon 250, the opponent icon 253 showing an opponent character, and the opponent type icon 254 showing a type of an opponent sub-character (see FIG. 13). Therefore, in the player information screen, a player can easily understand information about the player's character(s), and can also know information about an opponent's character(s) based on the icons 253 and 254. Therefore, a player can easily determine whether or not to start the game, by viewing the player information screen.

In the player information screen, the own additional character image 246 is smaller than the player character image 243 and is larger than the opponent icon 253. Therefore, by displaying the player information screen, the game system 1 can show a relationship between a player character and an own sub-character (i.e., which of the two characters is a player character or a sub-character) in an easy-to-understand manner. In addition, by displaying the opponent icon 253, the game system 1 allows a player to know an opponent character, in such a form that the opponent icon 253 does not much interfere with the own additional character image 246 or the player character image 243.

(Sub-Character Information Screen)

Figure 14:
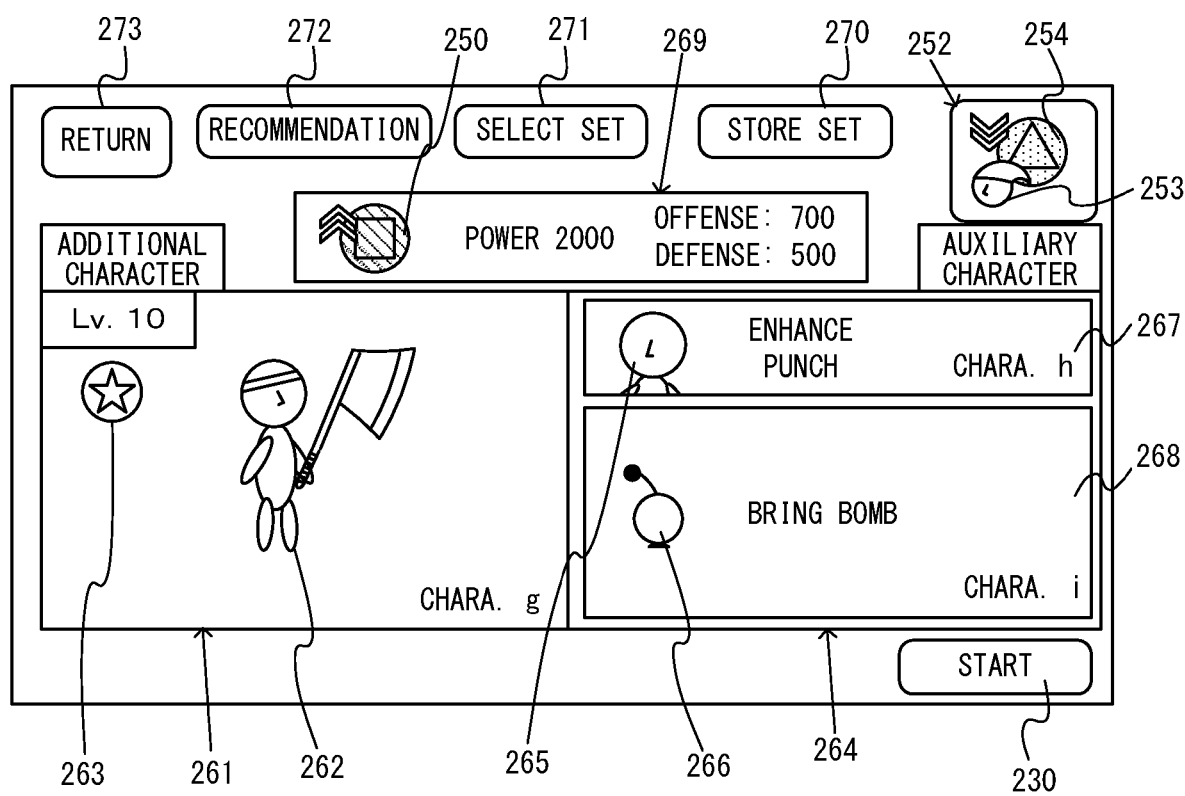
FIG. 14 is a diagram showing an example of a non-limiting sub-character information screen.

FIG. 14 is a diagram showing an example of the sub-character information screen. The sub-character information screen shows information about own sub-characters (i.e., an additional character and an auxiliary character) selected by a player.

As shown in FIG. 14, the sub-character information screen contains an additional character setting region 261. In the additional character setting region 261, information about a selected additional character is displayed. Specifically, the game system 1 displays the following pieces of information in the additional character setting region 261.

Image 262 showing a selected additional character

Name of the additional character ("Chara. g" in FIG. 14)

Current level of the additional character ("Lv. 10" in FIG. 14)

Group icon 263 showing a group to which the additional character belongs

Note that the sub-character information screen of FIG. 14 shows a situation that an additional character has been selected. Although not shown, if an additional character has not been selected when the sub-character information screen is displayed, the additional character setting region 261 contains information indicating that an additional character has not been selected.

In the exemplary embodiment, a player is allowed to give a selection operation instruction to perform an operation of selecting an additional character, by activating the additional character setting region 261. Specifically, in the exemplary embodiment, in response to a player's selection operation instruction, an own additional character selection process is executed. Specifically, the game system 1 initially displays, on the display device, a selection screen (not shown) containing candidates for an additional character to be selected. For example, the selection screen displays a list of candidates for an additional character to be selected, together with pieces of information (a name, an additional effect, a type, etc.) about each additional character. Note that in the exemplary embodiment, additional characters displayed as selection candidates in the selection screen are possessed by a player (i.e., additional characters that have already been acquired). Note that in the exemplary embodiment, in order to allow a player who plays the game with competition for the first time to select a sub-character, a sub-character(s) that is originally possessed by a player may be previously prepared.

A player specifies one of the candidates for an additional character to be selected that are included in the selection screen to select an additional character. After an additional character is selected in the selection screen, the game system 1 changes the display of the display device from the selection screen to the sub-character information screen. After the display is changed, the additional character setting region 261 in the sub-character information screen displays pieces of information about the selected additional character (see FIG. 14). Note that when a player activates the additional character setting region 261, in which the selected additional character is being displayed, the player is allowed to select a different additional character (in other words, reselect an additional character).

As shown in FIG. 14, the sub-character information screen includes an auxiliary character setting region 264. The auxiliary character setting region 264 displays pieces of information about one or more selected auxiliary characters. Specifically, the game system 1 displays the following pieces of information about each auxiliary character in the auxiliary character setting region 264.

Image of the selected auxiliary character (images 265 and 268 in FIG. 14)

Name of the auxiliary character ("Chara. h" and "Chara. i" in FIG. 14)

Additional effect given by the auxiliary character (specifically, the effect of a skill: "enhancing punch" and "bringing a bomb" in FIG. 14)

Note that in the sub-character information screen of FIG. 14, a situation where auxiliary characters have been selected is displayed. Although not shown, if an auxiliary character has not been selected when the sub-character information screen is displayed, the auxiliary character setting region 264 contains information indicating that an auxiliary character has not been selected.

The auxiliary character setting region 264 may also display information about a plurality of auxiliary characters. In the example of FIG. 14, there are two selected auxiliary characters, and the auxiliary character setting region 264 includes a region 267 in which information about an auxiliary character having the name "Chara. h" is displayed, and a region 268 in which information about an auxiliary character having the name "Chara. i" is displayed. Note that a region for an auxiliary character in the auxiliary character setting region 264 has an area corresponding to the number of slots to be occupied by the auxiliary character. In the example of FIG. 14, it is assumed that the number of slots to be occupied by the auxiliary character having the name "Chara. h" is "1," and the number of slots to be occupied by the auxiliary character having the name "Chara. i" is "2." Therefore, the region 268 has a display size that is two times as large as that of the region 267. Thus, the number of slots to be occupied by each auxiliary character can be shown to a player in an easy-to-understand manner. Note that the additional character setting region 261 may have a display area corresponding to the slot capacity of an additional character. As a result, a relationship between the slot capacity of an additional character and the number of slots to be occupied by each auxiliary character can be shown to a player in an easy-to-understand manner.

In the exemplary embodiment, a player is allowed to perform a selection operation instruction to perform an operation of selecting an auxiliary character, by activating the auxiliary character setting region 264. Specifically, in response to the selection operation instruction given by a player, the game system 1 executes an own auxiliary character selection process. More specifically, the game system 1 initially displays, on the display device, a selection screen (not shown) including candidates for an auxiliary character to be selected. For example, the selection screen displays a list of candidates for an auxiliary character to be selected, together with pieces of information (a name, an additional effect, etc.) about each auxiliary character candidate. Note that in the exemplary embodiment, auxiliary characters shown as selection candidates in the selection screen are possessed by a player (i.e., auxiliary characters that have already been acquired).

A player specifies one of the selection candidates in the selection screen to select an auxiliary character. After an auxiliary character is selected in the selection screen, the game system 1 changes the display of the display device from the selection screen to the sub-character information screen. After the display is changed, information about the selected auxiliary character is displayed in the auxiliary character setting region 264 in the sub-character information screen (see FIG. 14). Note that a player is allowed to select an additional auxiliary character or reselect an auxiliary character by activating the auxiliary character setting region 264 displaying the information about the selected auxiliary character.

Note that as described above, in the exemplary embodiment, the game system 1 permits combination of an additional character with one or more auxiliary characters, provided that the amount of these auxiliary characters is smaller than or equal to the slot capacity of the additional character. Specifically, in the selection screen, if the selection of a new auxiliary character causes the total number of slots to be occupied by the selected auxiliary characters to exceed the slot capacity of the selected additional character, the game system 1 may forbid selection of that new auxiliary character. In the exemplary embodiment, by setting a condition for combination of sub-characters using slots as described above, the strategic aspect of addition of a sub-character to a player character can be improved, resulting in a further improvement in the strategic aspect of the game with competition.

As shown in FIG. 14, the sub-character information screen contains an additional effect region 269. In the additional effect region 269, information of an effect that is to be given to a player character by a selected sub-character is displayed. Specifically, in the additional effect region 269, an own type icon 250 and information of overall power are displayed, as in the additional effect region 249 of the player information screen. In the additional effect region 269, offensive power and defensive power parameters for enhancing the performance of an operational character are displayed. Note that the offensive power and defensive power parameters are included in the information about the additional effect of an additional character. Thus, in the exemplary embodiment, an additional effect region is also displayed in the sub-character information screen, as in the player information screen. Therefore, the game system 1 can show, to a player, information for determining to select an own sub-character in an easy-to-understand manner, which allows the player to easily set a sub-character.

As shown in FIG. 14, as with the player information screen, the sub-character information screen contains an opponent information region 252 in which an opponent icon 253 and an opponent type icon 254 are displayed. Therefore, in the exemplary embodiment, a player can know information about an opponent character and an opponent sub-character in the sub-character information screen, as in the player information screen. A player can also give a change instruction to change the display of the display device to the opponent information screen (FIG. 11) by an input for activating the opponent information region 252.

As shown in FIG. 14, the sub-character information screen contains a storage instruction image 270, a set call image 271, and an automatic selection image 272. The storage instruction image 270 is used by a player to give a set storage instruction to store a set of a selected additional character and auxiliary character (i.e., a set of an additional character and an auxiliary character displayed in the sub-character information screen). Specifically, the game system 1 stores a set of a selected additional character and auxiliary character in response to an input for activating the storage instruction image 270.

The set call image 271 is used by a player to give an instruction to display a selection screen showing a list of the stored sets. Specifically, the game system 1 displays the selection screen in response to an input for activating the set call image 271, and receives a player's instruction to specify one from the set list. In response to the instruction to specify a set, the game system 1 displays the sub-character information screen showing sub-characters included in the specified set. Thus, in the exemplary embodiment, a player can select an additional character and an auxiliary character individually or as a set.

The automatic selection image 272 is used by a player to give an instruction to the game system 1 to automatically select a sub-character. Specifically, in response to an input for activating the automatic selection image 272, the game system 1 selects a sub-character, and displays the sub-character information screen showing the selected sub-character. Note that a sub-character may be selected in any suitable manner. For example, the game system 1 selects a sub-character that has an advantage and disadvantage relationship in which that sub-character is advantageous over a selected opponent sub-character. Thus, in the exemplary embodiment, a player causes the game system 1 to select a sub-character.

As shown in FIG. 14, the sub-character information screen contains a return instruction image 273 for giving an instruction to change the display of the display device to the player information screen. Specifically, a player can give a change instruction to change the display of the display device to the player information screen (FIG. 13) by an input for activating the return instruction image 273.

The sub-character information screen also contains a start instruction image 230 for giving a start instruction to start the game with competition (see FIG. 14), as with the opponent information screen and the player information screen. Specifically, a player can give the start instruction in the sub-character information screen, as in the opponent information screen and the player information screen.

(Waiting Screen)

Figure 15:
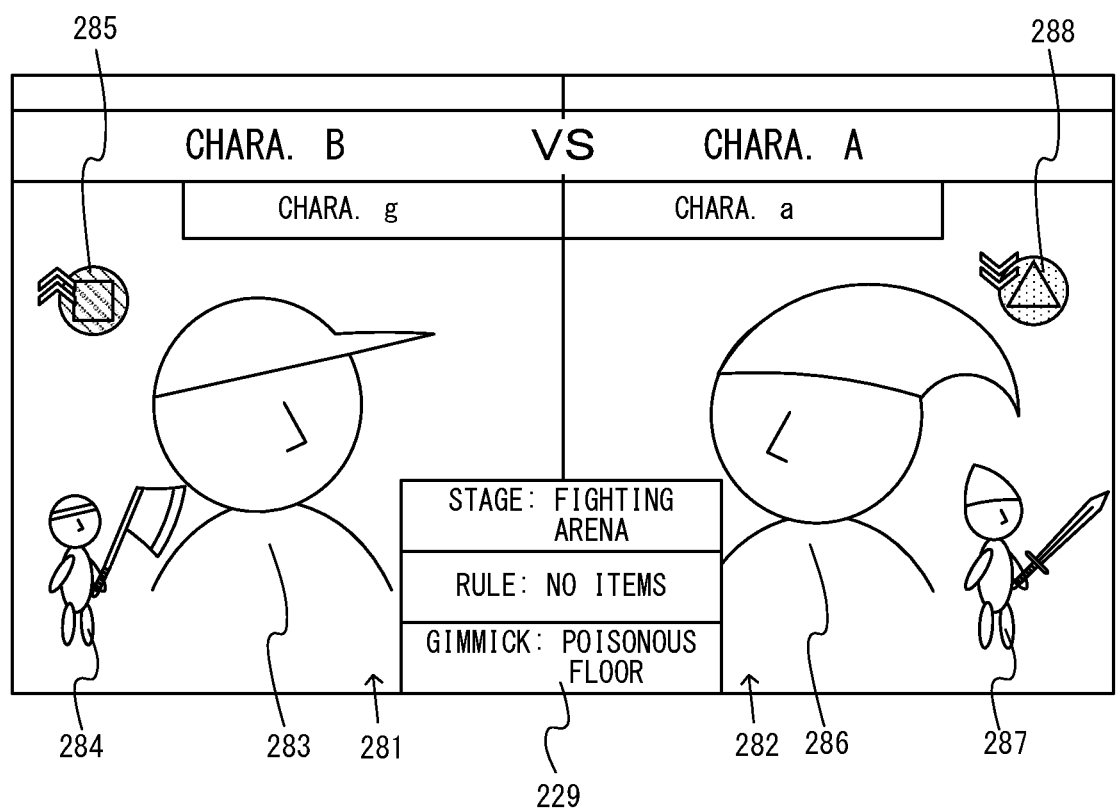
FIG. 15 is a diagram showing an example of a non-limiting waiting screen.

FIG. 15 is a diagram showing an example of the waiting screen. The waiting screen is displayed in a game starting process that is executed in response to the start instruction. Following a screen in which the start instruction has been given, the waiting screen is displayed on the display device. In the waiting screen, displayed are both information about a player's characters (i.e., a player character and an additional character added thereto) and information about an opponent's characters (i.e., an opponent character and an opponent sub-character added thereto) in the game with competition.

As shown in FIG. 15, the waiting screen contains a player region 281 and an opponent region 282. In the exemplary embodiment, the player region 281 is disposed on the left side of the center of the waiting screen, and the opponent region 282 is disposed on the right side of the center of the waiting screen. The player region 281 and the opponent region 282 have substantially the same size.

In the player region 281, as information about the selected player character, a name ("Chara. B" in FIG. 15) of the player character and an image 283 showing the player character are displayed. In the player region 281, as information about the selected additional character, a name ("Chara. g" in FIG. 15) of the additional character and an image 284 showing the additional character are displayed. Note that in another exemplary embodiment, in the player region 281, information about an auxiliary character combined with the selected additional character (e.g., a name or image of the auxiliary character) may also be displayed.

In the player region 281, an own type icon 285 indicating a type of the selected additional character is displayed. As with the own type icon 228 (see FIG. 12), the own type icon 285 contains a type image and an advantage and disadvantage image.

In the opponent region 282, as information about the selected opponent character, a name ("Chara. A" in FIG. 15) of the opponent character and an image 286 showing the opponent character are displayed. In the opponent region 282, as information about the selected opponent sub-character, a name ("Chara. a" in FIG. 15) of the opponent sub-character and an image 287 showing the opponent sub-character are displayed.

In the opponent region 282, an opponent type icon 288 indicating a type of the selected opponent sub-character is also displayed. As with the opponent type icon 254 (see FIG. 13), the opponent type icon 288 contains a type image and an advantage and disadvantage image.

In the waiting screen, images showing operational characters (i.e., a player character and an opponent character) are larger than images showing additional characters (i.e., an own sub-character and an opponent sub-character) added to the operational characters. Therefore, by viewing the waiting screen, a player can easily determine a relationship between an operational character and a sub-character (i.e., which of the two characters is an operational character or a sub-character).

As shown in FIG. 15, the waiting screen also contains the game condition image 229 (FIG. 11). Therefore, from the waiting screen, a player can know the game condition related to the game with competition.

As described above, the waiting screen contains the player character image 283, the own sub-character image 284, the own type icon image 285, the opponent character image 286, the opponent sub-character image 287, and the opponent type icon image 288. As a result, before the start of the game with competition, a player can know both information about their own characters and an opponent's characters, and in addition, advantage and disadvantage therebetween.

Note that in the exemplary embodiment, the waiting screen does not contain an image that is used by a player to give an instruction, such as the instruction images (e.g., the start instruction image and the return instruction image). Therefore, in the waiting screen, both information about a player's characters and information about an opponent's characters in the game with competition can be displayed in a large size.

Note that the game system 1 may display the waiting screen in the game starting process during a portion of the period of time between when the start instruction is input and when the process of the game with competition is started. For example, in another exemplary embodiment, a screen different from the waiting screen may be displayed during another portion of the above period of time.

(Process of Game with Competition and Screen for the Game with Competition)

The game system 1 executes the process for starting the game with competition after receiving the start instruction, and thereafter, executes the process of the game with competition for executing the game with competition. The process of the game with competition controls a player character in a virtual space according to a player's operational input, and generates an image of the screen for the game with competition. In the process of the game with competition, the screen for the game with competition is displayed on the display device. The process of the game with competition will now be described in detail.

Figure 16:
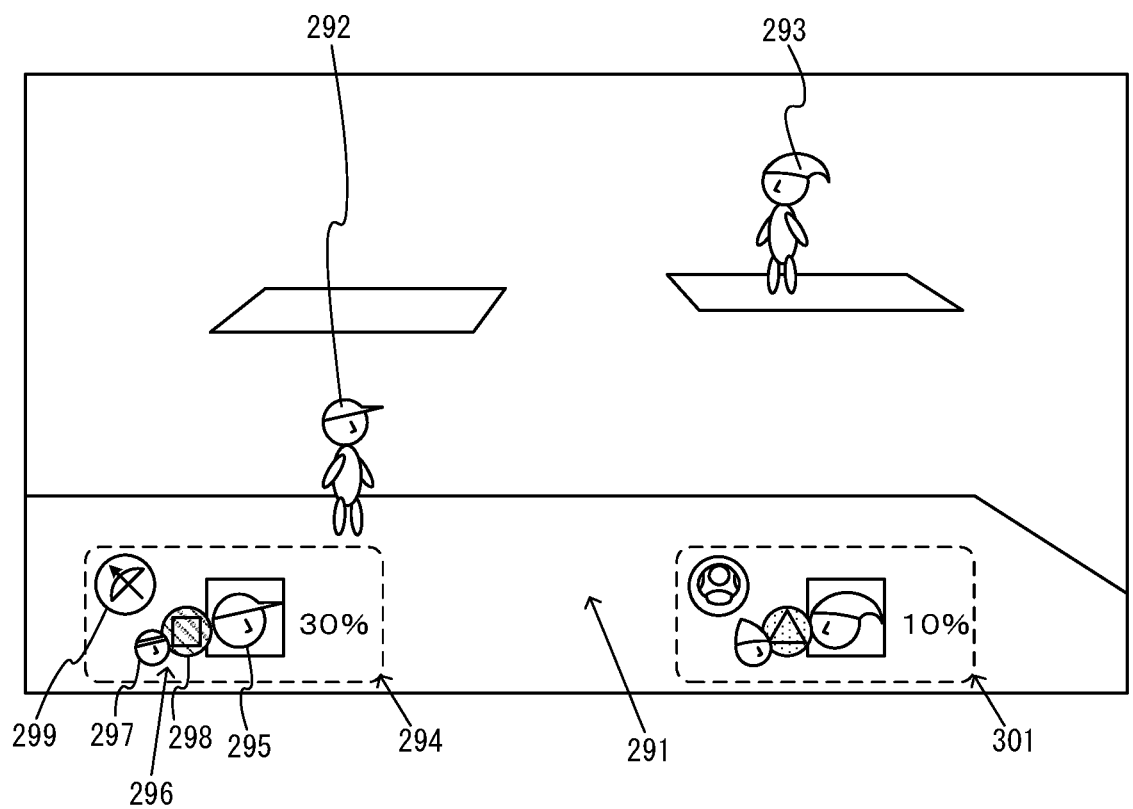
FIG. 16 is a diagram showing an example of a non-limiting screen for the game with competition.

FIG. 16 is a diagram showing an example of the screen for the game with competition. As shown in FIG. 16, the screen for the game with competition contains an image 291 showing a virtual space, an image 292 showing a player character disposed in the virtual space, and an image 293 showing an opponent character disposed in the virtual space. Note that in the exemplary embodiment, it is assumed that the game system 1 does not dispose a model (e.g., a three-dimensional model) of a sub-character in the virtual space. In another exemplary embodiment, a model of a sub-character may be disposed in the virtual space.

In the exemplary embodiment, the game system 1 executes a fighting game with competition in the process of the game with competition. The process of the game with competition is executed based on the performance of a player character to which an effect associated with a selected own sub-character is added, the performance of an opponent character to which an effect associated with a selected opponent sub-character is added, and advantage and disadvantage between a type of the own sub-character (specifically, an additional character) and a type of the opponent sub-character. Specifically, in the fighting game with competition, when a player character attacks an opponent character, the game system 1 determines the amount of damage to the opponent character caused by the player character's attack, based on the following (a) and (b):

(a) the performances of the player character and the opponent character; and (b) the advantage and disadvantage between the type of an additional character added to the player character and the type of an additional character added to the opponent character.

Concerning (a), the game system 1 increases the offensive power of the player character based on the additional effect of the own additional character, increases the defensive power of the opponent character based on the additional effect of the opponent character, and calculates the amount of damage based on the increased offensive power and defensive power. Concerning (b), if there is an advantage and disadvantage relationship indicating that the type for the player character is advantageous over the type for the opponent character, the game system 1 increases the amount of damage more than if there is not such an advantage and disadvantage relationship. Meanwhile, if there is an advantage and disadvantage relationship indicating that the type for the player character is disadvantageous in relation to the type for the opponent character, the game system 1 decreases the amount of damage more than if there is not such an advantage and disadvantage relationship.

Also, concerning (a), in the exemplary embodiment, if a group to which an operational character belongs corresponds to a group to which an additional character belongs, the game system 1 increases the additional effect of the additional character more than if there is not such a correspondence. For example, if a group to which a player character belongs corresponds to a group to which an own additional character belongs, the amount of an increase in offensive power and defensive power caused by the own additional character is set greater than if there is not such a correspondence. Thus, by changing the additional effect, depending on whether or not there is a group correspondence, the strategic aspect of the game can be further improved. Note that in another exemplary embodiment, the game system 1 may change the additional effect of an additional character, based on the group of an auxiliary character in addition to the groups of an operational character and the additional character.

Note that, as described above, in the exemplary embodiment, characters appear in other game applications (i.e., game applications other than the game application of the game with competition), and characters are divided into groups for each game application or each series of game applications. Therefore, if a player knows other game applications, the player can prepare an advantageous combination of a player character and an additional character, resulting in an increase in the amusingness of the game. In addition, because grouping is performed for each of other game applications, a player can easily understand a correspondence between a group to which a player character belongs and a group to which an additional character belongs.

In the exemplary embodiment, if an additional character is combined with an auxiliary character, the additional effect of the auxiliary character is given to an operational character. For example, if an additional character is combined with an auxiliary character having a skill "enhancing a punch" (i.e., an additional effect), the game system 1 increases the power of a punch of an operational character to which the additional character is added. As described above, if an additional character added to an operational character is combined with an auxiliary character, the game system 1 executes the process of the game with competition based on the performance of the operational character given the effect of the additional character as well as the effect of the auxiliary character. As a result, an operational character can be given the effects of two kinds of sub-characters combined together, so that an increased variety of additional effects can be provided, resulting in a further improvement in the strategic aspect of the game.

As shown in FIG. 16, the screen for the game with competition includes a character state display region (e.g., a region 294 in FIG. 16) for each character. Note that in FIG. 16, the boundary of the character state display region 294 is indicated by a dashed line, which may not actually be displayed. In each character state display region, information about a player character and an own sub-character(s) are displayed.

In the character state display region 294 related to a player character, displayed are an icon 295 indicating the player character and an additional character icon 296 indicating an additional character added to the player character (see FIG. 16). In the exemplary embodiment, the additional character icon 296 is displayed in association with the icon 295 indicating the player character. The additional character icon 296 contains an image 297 showing the additional character, and an image 298 showing a type of the additional character.

As described above, the screen for the game with competition contains the image 291 of the virtual space, the image 292 showing a player character, the image 297 showing an additional character added to the player character, and the image 298 showing a type of the additional character. This allows a player to know an additional character added to a player character and a type thereof, which are useful information in the game with competition.

In addition, as shown in FIG. 16, the group icon 299 indicating a group to which a player character belongs is displayed in the character state display region 294. Therefore, in the exemplary embodiment, in the game with competition, a player can easily understand whether or not a group to which a player character belongs corresponds to a group to which an additional character belongs.

In addition, information of a current state of the player character is displayed in the character state display region 294 (see FIG. 16). Specifically, the information indicates the amount of damage to the player character. Note that in another exemplary embodiment, for example, a numerical value or gage indicating the remaining physical strength of the player character may be displayed as the information of a current state of the player character.

In another exemplary embodiment, in addition to the information shown in FIG. 16, information about an auxiliary character may be displayed in the character state display region 294. For example, an image of a selected auxiliary character may be displayed in the character state display region 294, and an image of a skill of the auxiliary character may be displayed in the character state display region 294.

In a character state display region 301 related to an opponent character, information similar to that which is displayed in the character state display region 294 related to a player character is displayed. Specifically, in the character state display region 301, displayed are an icon indicating an opponent character, an icon indicating an opponent sub-character added to the opponent character, a group icon indicating a group to which the opponent character belongs, and information of a current state of the opponent character.

As described above, in the exemplary embodiment, the screen for the game with competition contains an image of an opponent character, an image of an opponent sub-character added to the opponent character, and an image of a type of the opponent sub-character (see FIG. 16). This allows a player to know information about an opponent character and a sub-character added thereto, in addition to information about a player character and a sub-character added thereto, which are useful information in the game with competition.

The game system 1 ends the game with competition if a condition for ending the game is satisfied. Note that any suitable condition for ending the game is used. For example, the condition for ending the game may be that a predetermined period of time has elapsed from the start of the game with competition, or that the game is over for any of a player character and an opponent character (specifically, the damage to any of these characters is greater than or equal to a predetermined value).

In the exemplary embodiment, after the end of the game with competition, the game system 1 increases the experience point of an additional character added to a player character in the game with competition. The amount of an increase in the experience point may be a predetermined amount, or may be determined based on the result of the game with competition (e.g., the win or loss of a player character, or damage which a player character has caused to an opponent character).

If the experience point of the additional character has reached a predetermined value as a result of the increase of the experience point, the game system 1 increases the level of the additional character. The game system 1 also updates a parameter related to the additional character, based on the increase of the level. Specifically, a parameter related to the above additional effect is updated such that a greater effect is given to an operational character (more specifically, the value of the parameter is increased). Thus, in the exemplary embodiment, a player can make an additional character stronger by increasing the level of the additional character.

In the exemplary embodiment, even for an additional character that has a small additional effect when the level thereof is low, a player can make the additional character stronger by increasing the level of the additional character by using the additional character in the game with competition. Therefore, the strategic aspect of the game with competition using an additional character can be further improved. In addition, in the exemplary embodiment, by setting a factor (i.e., the level) that increases as the game with competition progresses for an additional character, a player can get the impression that an additional character participates together with an operational character in the game with competition, although the additional character does not appear in the virtual space of the game with competition.

Note that the game system 1 may cause an additional character to another additional character (e.g., a stronger additional character) if the level of the original additional character has reached a predetermined value (e.g., an upper limit value). As a result, a player can be strongly motivated to grow an additional character, resulting in a further improvement in the strategic aspect of the game with competition using an additional character.

The parameter of an additional character may be updated under other conditions related to the additional character, instead of the increase of the level. For example, in another exemplary embodiment, the parameter (e.g., an experience point) of an additional character may be updated if an item has been used for the additional character. The level of an additional character may be increased if an item has been used for the additional character.

3. Specific Example Process in Game System

Next, a specific example information process in the game system 1 will be described with reference to FIGS. 17-20.

[3-1. Data Used in Information Process]

Figure 17:
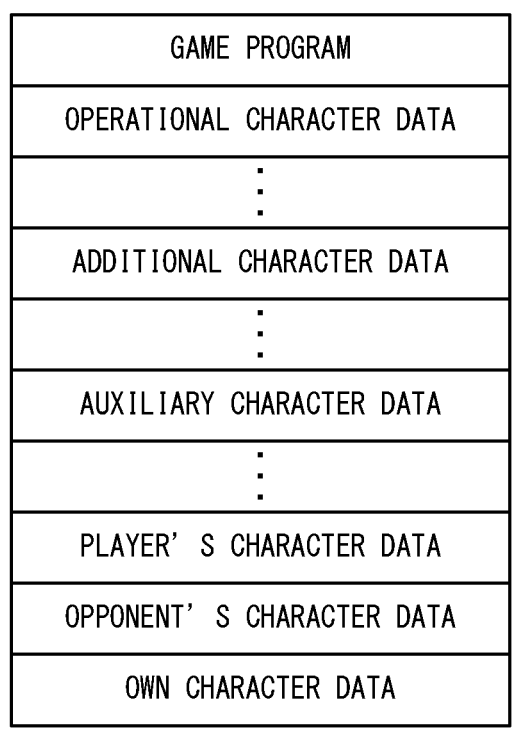
FIG. 17 is a diagram showing an example of various pieces of data used in an information process in a non-limiting game system.

FIG. 17 is a diagram showing an example of various pieces of data used in an information process in the game system 1. The various pieces of information shown in FIG. 17 are stored in a storage medium (e.g., the flash memory 84, the DRAM 85, and/or a memory card inserted in the slot 23) that can be accessed by the main body apparatus 2.

As shown in FIG. 17, the game system 1 stores a game program. The game program is for executing the game with competition in the exemplary embodiment, and is stored in, for example, the flash memory 84, the DRAM 85, and/or a memory card inserted in the slot 23.

As shown in FIG. 17, the game system 1 also stores operational character data, additional character data, and auxiliary character data. These pieces of data may be stored together with the game program in a storage medium.

The operational character data is related to an operational character that is prepared (in other words, can be used) in the game with competition. The operational character data includes data indicating various pieces of information about an operational character (e.g., an image and various parameters related to an operational character). In the exemplary embodiment, a plurality of operational characters are prepared, and the game system 1 stores operational character data for each operational character.

The additional character data is related to an additional character prepared in the game with competition. The additional character data includes data indicating an image and various parameters related to an additional character (i.e., information described in the above section "(Information set for additional character)"). In the exemplary embodiment, a plurality of additional characters are prepared, and the game system 1 stores the additional character data for each additional character.

The auxiliary character data is related to an auxiliary character prepared in the game with competition. The auxiliary character data includes data indicating an image and various parameters related to an auxiliary character (i.e., information described in the above section "(Information set for auxiliary character)"). In the exemplary embodiment, a plurality of auxiliary characters are prepared, and the game system 1 stores the auxiliary character data for each auxiliary character.

As shown in FIG. 17, the game system 1 also contains a player's character data, an opponent's character data, and own character data. These pieces of data (in other words, information) are generated and used in game processes (see FIGS. 18-20) executed by the game program.

A player's character data indicates characters (i.e., a player character and an own sub-character) used by a player in the game with competition. Specifically, a player's character data includes data indicating an identifier for each character used by the player.

An opponent's character data indicates characters (i.e., an opponent character and an opponent sub-character) that are an opponent in the game with competition. Specifically, an opponent's character data includes data indicating an identifier for each character that is an opponent.

The own character data indicates one or some of sub-characters prepared in the game with competition that are possessed by a player. Specifically, the own character data includes data indicating an identifier for a sub-character possessed by a player.

Note that in addition to the data shown in FIG. 17, a storage medium stores various pieces of data used in game processes executed by the game program. For example, in the exemplary embodiment, data indicating a set of an additional character and an auxiliary character is stored into a storage medium according to the storage instruction.

[3-2. Processes Executed in Game System]

Figure 18:
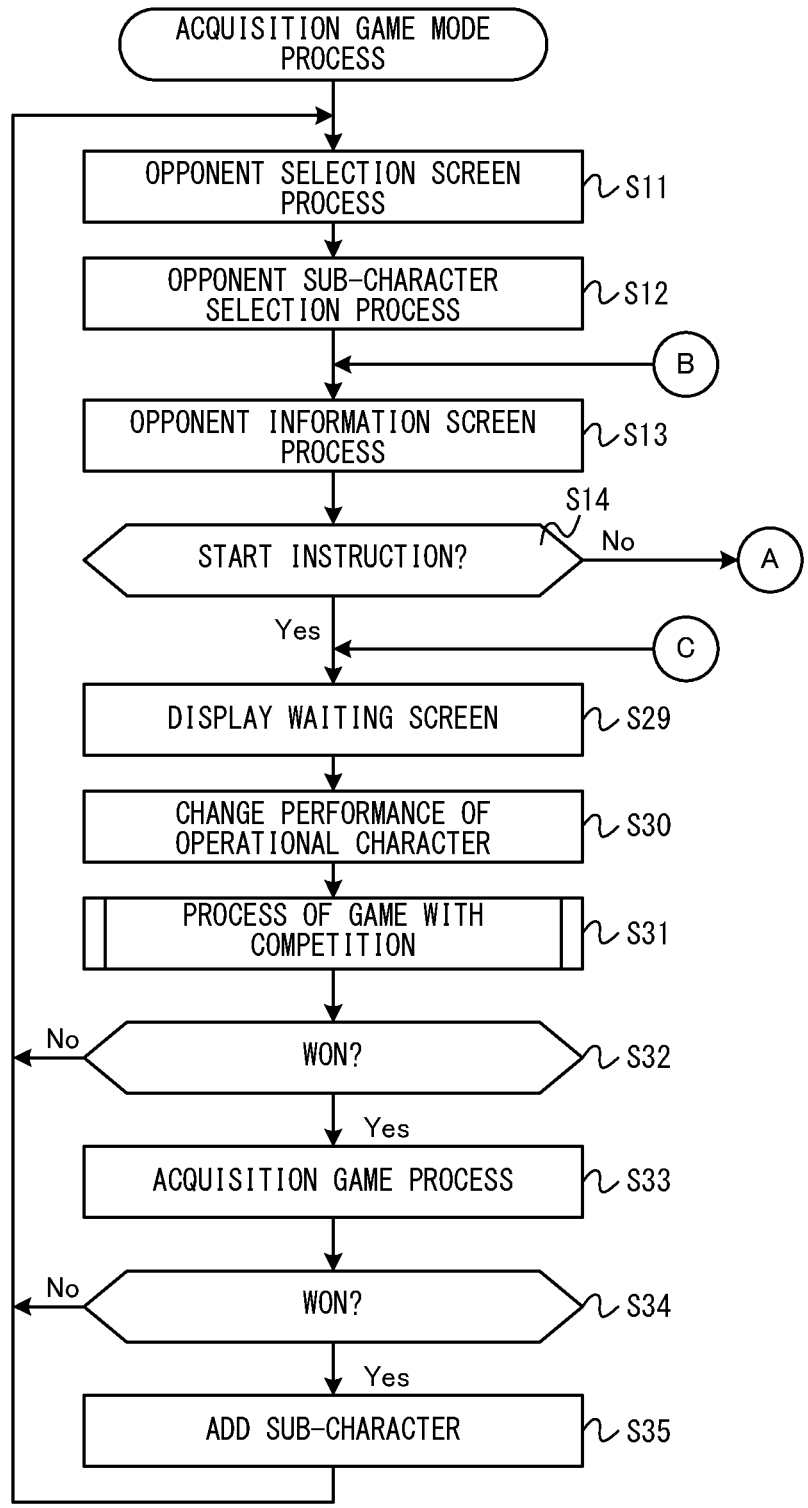
FIG. 18 is a flowchart showing an example information process executed by a non-limiting game system.
Figure 19:
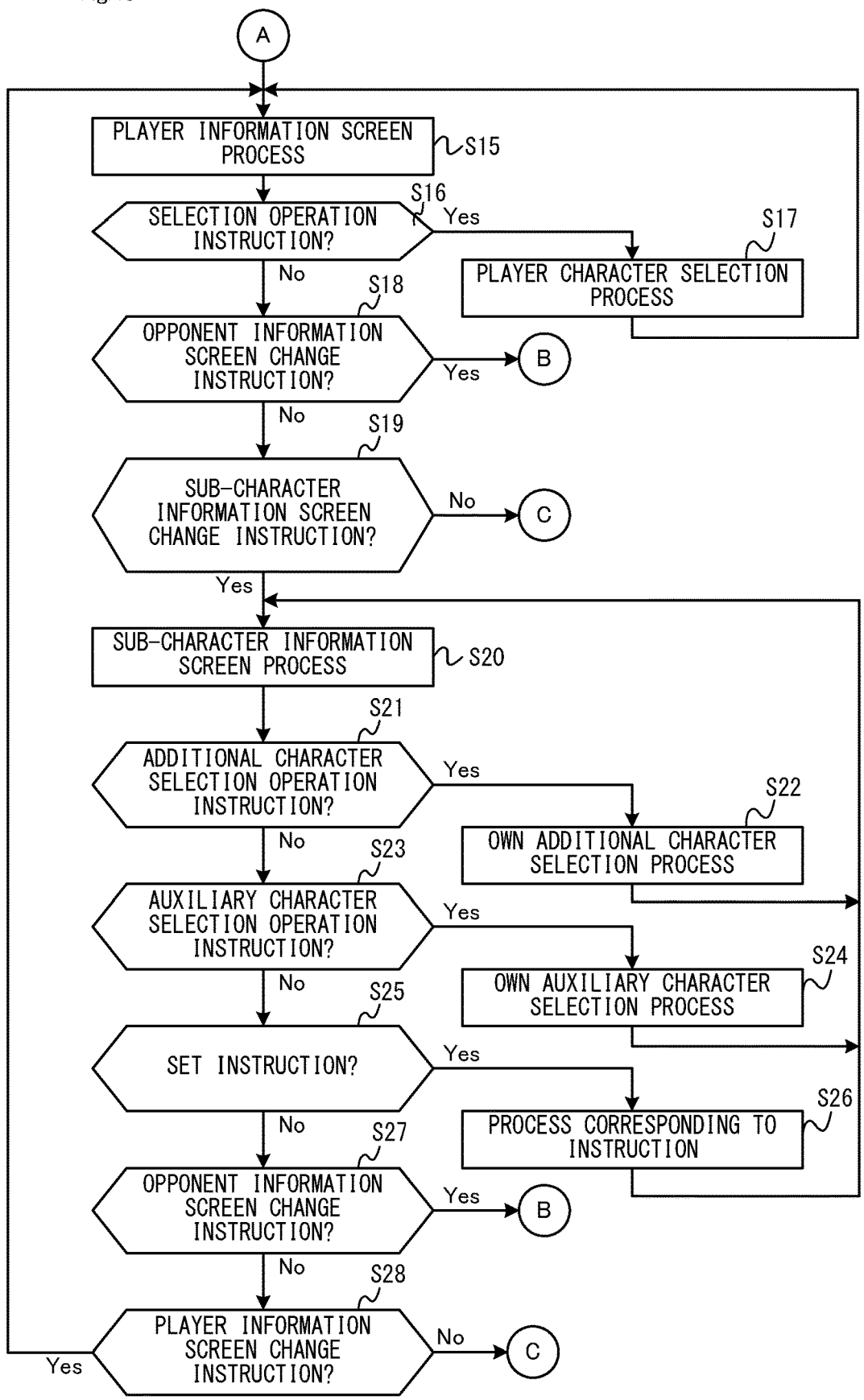
FIG. 19 is a flowchart showing an example information process executed by a non-limiting game system.

FIGS. 18 and 19 are flowcharts showing example information processes executed by the game system 1. A series of steps shown in FIG. 18 is executed in the acquisition game mode. Specifically, the series of steps of FIG. 18 is started in response to a player's instruction to start the acquisition game mode during execution of the game program.

Figure 20:
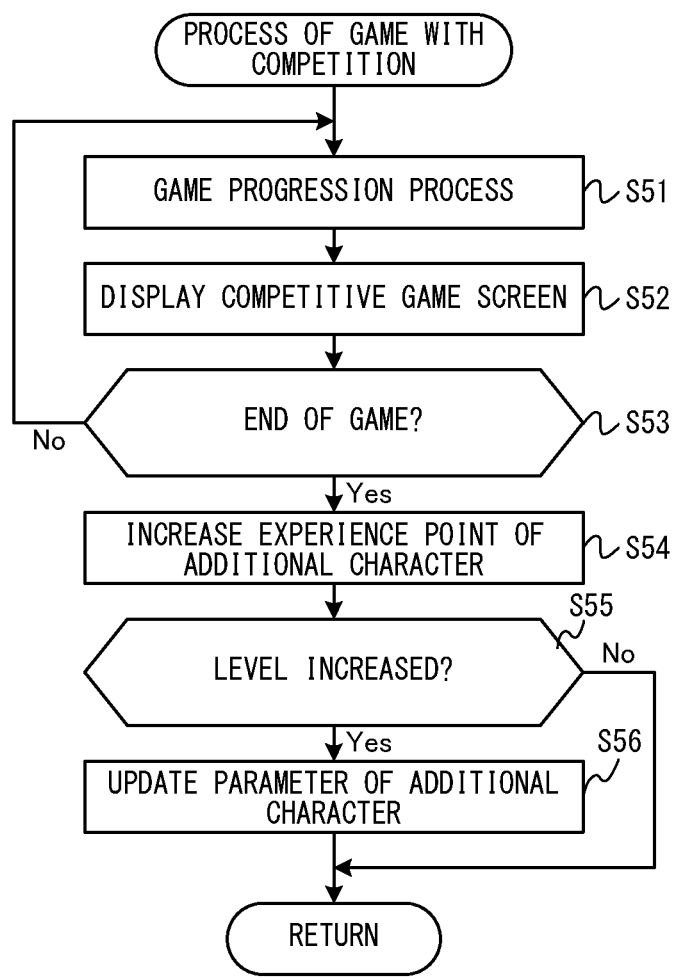
FIG. 20 is a sub-flowchart showing a detailed example flow of a process of the game with competition in step S31 of FIG. 18.

Note that in the exemplary embodiment, it is assumed that the processor 81 of the main body apparatus 2 executes the game program stored in the game system 1 to execute each step of FIGS. 18-20. Note that in another exemplary embodiment, a portion of the steps may be executed by a processor (e.g., a dedicated circuit) other than the processor 81. In the case where the game system 1 can communicate with another information processing device (e.g., a server), a portion of the steps of FIGS. 18-20 may be executed by the information processing device. The steps of FIGS. 18-20, which are merely for illustrative purposes, may be executed in a different order, or another step may be executed in addition to (or instead of) each step, if a similar effect is obtained.

The processor 81 executes the steps of FIGS. 18-20 using a memory (e.g., the DRAM 85). Specifically, the processor 81 stores information (in other words, data) obtained in each process step into a memory, and reads the information from the memory when the information is required in a subsequent process step.

In step S11 of FIG. 18, the processor 81 executes an opponent selection screen process. In the opponent selection screen process, the opponent selection screen (FIG. 10) is displayed, and an input for specifying an opponent sub-character is received from a player. Specifically, the processor 81 generates an image of the opponent information screen, and causes the display device to display the image. The processor 81 also receives a player's input for specifying one of sub-characters displayed in the opponent information screen. Note that in the exemplary embodiment, the processor 81 receives a player's input as follows: the processor 81 acquires data indicating an input performed using an input unit (e.g., the touch panel 13, a button of a game controller, and/or an analog stick of a game controller, etc.) of the game system 1, from the input unit, and based on the acquired data, determines the presence or absence of an input and the value of the input. If an input for specifying a sub-character has been performed in step S11, step S12 is executed, following step S11.

In step S12, the processor 81 executes an opponent sub-character selection process. Specifically, the processor 81 selects the sub-character (specifically, an additional character or an auxiliary character) specified in step S1 as an opponent sub-character. The processor 81 also selects an opponent character to which the selected opponent sub-character is to be added. The processor 81 also stores an opponent's character data indicating the selected opponent sub-character and opponent character into a storage medium. Following step S12, step S13 is executed.

In step S13, the processor 81 executes an opponent information screen process. In the opponent selection screen process, the opponent information screen (FIG. 11) is displayed, and an input for a player's instruction (specifically, the change instruction and the start instruction) is received. Specifically, the processor 81 generates an image of the opponent information screen, and causes the display device to display the image. The processor 81 also determines which of the following instructions has been given.

Change instruction to change the display of the display device to the player information screen (i.e., an instruction to activate the player information region 226)

Start instruction to start the game with competition (i.e., an instruction to activate the start instruction image 230)

If one of the change instruction and the start instruction has been given, step S14 is executed, following step S13.

In step S14, the processor 81 determines whether or not the instruction received in step S13 is the start instruction. If the determination result of step S14 is positive, step S29 described below is executed. Otherwise (i.e., the change instruction has been given), step S15 of FIG. 19 is executed.

In step S15 of FIG. 19, the processor 81 executes a player information screen process. In the player information screen process, the player information screen (FIG. 13) is displayed, and a player's instruction (specifically, the selection operation instruction, the change instructions, and the start instruction) is received. Specifically, the processor 81 generates an image of the player information screen, and causes the display device to display the image. The processor 81 also determines which of the following instructions has been given.

Selection operation instruction to perform an operation of selecting a player character (i.e., an instruction to activate the player character selection image 245)

Change instruction to change the display of the display device to the sub-character information screen (i.e., an instruction to activate the sub-character selection image 251)

Change instruction to change the display of the display device to the opponent information screen (i.e., an instruction to activate the opponent information region 252)

Start instruction to start the game with competition (i.e., an instruction to activate the start instruction image 230)

If one of the four instructions has been given, step S16 is executed, following step S15.

In step S16, the processor 81 determines whether or not the instruction received in step S15 is the selection operation instruction. If the determination result of step S16 is positive, step S17 is executed. Otherwise, step S18 described below is executed.

In step S17, the processor 81 executes the player character selection process. Specifically, the processor 81 selects an operational character specified by a player, as a player character, according to the method described in the above section "(Player information screen)." The processor 81 also store data indicating the selected player character into a storage medium or updates the player's character data in the storage medium with that data (i.e., that data is added to the player's character data). Following step S17, step S15 (i.e., the player information screen process) is executed.

In step S18, the processor 81 determines whether or not the instruction received in step S15 is the change instruction to change the display of the display device to the opponent information screen. If the determination result of step S18 is positive, step S13 of FIG. 18 (i.e., the opponent information screen process) is executed again. Otherwise, step S19 is executed.

In step S19, the processor 81 determines whether or not the instruction received in step S15 is the change instruction to change the display of the display device to the sub-character information screen. If the determination result of step S19 is negative (i.e., the start instruction has been given), step S29 of FIG. 18 is executed. Otherwise, step S20 is executed.

In step S20, the processor 81 executes a sub-character information screen process. In the sub-character information screen process, the player character information screen (FIG. 14) is displayed, and a player's instruction (specifically, the selection operation instructions, the change instructions, the instruction related to a set, and the start instruction) is received. Specifically, the processor 81 generates an image of the sub-character information screen and causes the display device to display the image. The processor 81 also determines which of the following instructions has been given.

Selection operation instruction related to an additional character (i.e., an instruction to activate the additional character setting region 261)

Selection operation instruction related to an auxiliary character (i.e., an instruction to activate the auxiliary character setting region 264)

Change instruction to change the display of the display device to the opponent information screen (i.e., an instruction to activate the opponent information region 252)

Change instruction to change the display of the display device to the player information screen (i.e., an instruction to activate the return instruction image 273)

Set storage instruction (i.e., an instruction to activate the storage instruction image 270) Set call instruction (i.e., an instruction to activate the set call image 271) Automatic selection instruction (i.e., an instruction to activate the automatic selection image 272)

Start instruction to start the game with competition (i.e., an instruction to activate the start instruction image 230)

If any of the eight instructions has been given, step S21 is executed, following step S20.

In step S21, the processor 81 determines whether or not the instruction received in step S20 is the selection operation instruction related to an additional character. If the determination result of step S21 is positive, step S22 is executed. Otherwise, step S23 described below is executed.

In step S22, the processor 81 executes the own additional character selection process. Specifically, the processor 81 selects an additional character specified by a player, as an own sub-character, according to the method described in the above section "(Sub-character information screen)". The processor 81 also stores data indicating the selected own sub-character into a storage medium or updates the player's character data in the storage medium with that data (i.e., that data is added to the player's character data). Following step S22, step S20 (i.e., the sub-character information screen process) is executed again.

In step S23, the processor 81 determines whether or not the instruction received in step S20 is the selection operation instruction related to an auxiliary character. If the determination result of step S23 is positive, step S24 is executed. Otherwise, step S25 described below is executed.

In step S24, the processor 81 executes the own auxiliary character selection process. Specifically, the processor 81 selects an auxiliary character specified by a player, as an own sub-character, according to the method described in the above section "(Sub-character information screen)." The processor 81 also stores data indicating the selected own sub-character into a storage medium or updates the player's character data with that data (i.e., that data is added to the player's character data). Following step S24, step S20 (i.e., the sub-character information screen process) is executed again.

In step S25, the processor 81 determines whether or not the instruction received in step S20 is any of the instructions related to a set of an additional character and an auxiliary character (i.e., the set storage instruction, the set call instruction, and the automatic selection instruction). If the determination result of step S25 is positive, step S26 is executed. Otherwise, step S27 described below is executed.

In step S26, the processor 81 executes a process according to the player's instruction. Specifically, if the set storage instruction has been given, the processor 81 stores data indicating the selected set of an additional character and an auxiliary character into a storage medium. If the set call instruction has been given, the processor 81 generates the sub-character information screen showing a sub-character included in the set specified by the player. If the automatic selection instruction has been given, the processor 81 selects a sub-character according to a predetermined rule, and generates the sub-character information screen showing the selected sub-character. Note that if the set call instruction or the automatic selection instruction has been given, the processor 81 stores data indicating a sub-character included in a new set into a storage medium or updates the player's character data with that data (i.e., that data is added to the player's character data). Following step S26, step S20 (i.e., the sub-character information screen process) is executed again.

In step S27, the processor 81 determines whether or not the instruction received in step S20 is the change instruction to change the display of the display device to the opponent information screen. If the determination result of step S27 is positive, step S13 of FIG. 18 (i.e., the opponent information screen process) is executed again. Otherwise, step S28 is executed.

In step S28, the processor 81 determines whether or not the instruction received in step S20 is the change instruction to change the display of the display device to the player information screen. If the determination result of step S28 is positive, step S15 (i.e., the player information screen process) is executed again. Otherwise (i.e., the start instruction has been given), step S29 of FIG. 18 is executed.

Referring back to FIG. 11, in step S29, the processor 81 displays the waiting screen (FIG. 15). Specifically, the processor 81 generates an image of the waiting screen and causes the display device to display the image. Following step S29, step S30 is executed.

In step S30, the processor 81 changes the performances of the operational characters (i.e., the player character and the opponent character) based on the sub-characters added to the operational characters. Specifically, the processor 81 changes the performances of the operational characters such that effects associated with the sub-characters are given to the operational characters, according to the method described in the above section "(Process of game with competition and screen for game with competition)." As a specific process, the processor 81 changes parameters of the operational characters indicated by the operational character data stored in a storage medium, based on parameters of additional effects indicated by the additional character data and the auxiliary character data stored in a storage medium. Note that the processor 81 updates the player's character data stored in a storage medium with data of the player character whose parameter has been changed (i.e., that data is added to the player's character data), and updates the opponent's character data stored in a storage medium with data of the opponent character whose parameter has been changed (i.e., that data is added to the opponent's character data).

Note that in the exemplary embodiment, steps S29 and S30 are executed as the process for starting the game with competition of starting the game with competition. Following step S30, step S31 is executed.

In step S31, the processor 81 executes the process of the game with competition. The process of the game with competition will now be described in detail with reference to FIG. 20.

FIG. 20 is a sub-flowchart showing a detailed example flow of the process of the game with competition in step S31 of FIG. 18. In the process of the game with competition, initially, in step S51, the processor 81 executes a game progression process of causing the game with competition to progress. Specifically, the processor 81 controls and operates a player character in the virtual space according to a player's operational input, controls and operates an opponent character in the virtual space, and calculates the amount of damage to one operational character caused by the other operational character's attack. Note that the amount of damage is calculated according to the method described in the above section "(Process of game with competition and screen for game with competition)." Following step S51, step S52 is executed.

In step S52, the processor 81 generates a game image of the game with competition (see FIG. 16), and causes the display device to display the game image. Specifically, the processor 81 generates a game image of the virtual space in which a player character and an opponent character are disposed. The processor 81 also generates images showing information about the player character and the opponent character (sub-characters added to these characters), which are to be contained in the character state display regions. Thereafter, the processor 81 displays the images showing information about the player character and the opponent character on top of the game image of the virtual space. Following step S52, step S53 is executed.

In step S53, the processor 81 determines whether or not a condition for the end of the game with competition (i.e., the above end condition) is satisfied. If the determination result of step S53 is negative, step S51 is executed again. In the exemplary embodiment, steps S51-S53 in the process of the game with competition are repeated until the determination result of step S53 is positive. Meanwhile, if the determination result of step S53 is positive, step S54 is executed.

In step S54, the processor 81 increases the experience point of the additional character added to the player character in the game with competition. Specifically, the processor 81 increases the experience point of the additional character according to the method described in the above section "(Process of game with competition and screen for game with competition)." In addition, if the level of the additional character is increased, the level is increased by one. Following step S54, step S55 is executed.

In step S55, the processor 81 determines whether or not the level of the additional character used in the game with competition has been increased. If the determination result of step S55 is positive, step S56 is executed. Otherwise, the processor 81 ends the process of the game with competition.

In step S56, the processor 81 updates the parameter of an additional character whose level has been increased. Specifically, a predetermined parameter (e.g., the offensive power and defensive power parameters) of the additional character is changed such that the additional character can give a higher effect to an operational character. As a specific process, the processor 81 updates information about the predetermined parameter indicated by the additional character data stored in a storage medium, with the changed value. After the end of step S56, the processor 81 ends the process of the game with competition of FIG. 20.

Referring back to FIG. 18, following step S31 (i.e., the process of the game with competition), step S32 is executed. In step S32, the processor 81 determines whether or not the player character has defeated the opponent character in the game with competition. If the determination result of step S32 is positive, step S33 is executed. Otherwise, the processor 81 executes step S11 again.

In step S33, the processor 81 executes the acquisition mini-game process in which the acquisition mini-game is executed. In the acquisition mini-game, the processor 81 determines whether the player has won or lost the acquisition mini-game, based on the player's operational input. After the end of the acquisition mini-game, step S34 is executed.

In step S34, the processor 81 determines whether or not the player has won the acquisition mini-game. In step S34, it is determined whether or not an addition condition for giving a sub-character to a player is satisfied. If the determination result of step S34 is positive, step S35 is executed. Otherwise, the processor 81 executes step S11 again.

In step S35, the processor 81 executes a giving process of giving the opponent sub-character used in the game with competition to the player. Specifically, the processor 81 updates the own character data stored in a storage medium with data indicating the opponent sub-character (i.e., that data is added to the own character data). As a result, a sub-character that is the opponent sub-character is given to the player, and thereafter, the player can use the sub-character in the game with competition. Following step S35, the processor 81 executes step S11 again.

4. Effects and Variations of the Exemplary Embodiment

As described above, in the exemplary embodiment, a sub-character can be added to an operational character, which feature can improve the strategic aspect of the game with competition. Here, in the exemplary embodiment, when a character that is to be used in the game with competition is selected (i.e., steps S1-S4 of FIG. 9 are executed), the opponent information screen (step S2) and the player information screen (step S3) are displayed to show, to a player, information about sub-characters that can be added to operational characters. At this time, the player can know information about the player's character from the own icon 227 and the own type icon 228 in the opponent information screen related to an opponent's character (see FIG. 11). The player can also know information about an opponent's character from the opponent icon 253 and the opponent type icon 254 in the player information screen related to the player's character (see FIG. 13). Thus, in the exemplary embodiment, a player can know both information about the player's character and information about an opponent's character in each of the opponent information screen and the player information screen. A player can also start the game with competition in both of the opponent information screen and the player information screen. Thus, the game system 1 allows a player to easily perform the character selection operation before the start of the game with competition.

In addition, a player adds an additional character to an operational character in the game with competition, and therefore, the game system 1 can give a player the impression that an additional character participates together with an operational character in the game with competition. The game system 1 can cause more characters than operational characters to appear in the game with competition, resulting in an improvement in the amusingness of the game with competition. In the exemplary embodiment, the game system 1 does not dispose a model (e.g., a three-dimensional model) of a sub-character in the virtual space in which the game with competition is played, and therefore, the processing load of the character operation control process and the character image generation process in the game with competition can be reduced. In addition, the use of sub-characters, which can easily be caused to appear, allows a large number of characters to easily appear in the game with competition.

In the exemplary embodiment, an image of an additional character is displayed in various game screens (i.e., the opponent information screen, the player information screen, the sub-character information screen, the waiting screen, and the screen for the game with competition). Therefore, even when a large number of additional characters are prepared, a player can easily remember the additional characters.

Note that in the exemplary embodiment, the effect that an additional character gives to an operational character is not particularly limited. A plurality of additional characters that give different effects may be prepared. As a result, an increased variety of effects that are given by additional characters may be provided, leading to an improvement in the strategic aspect of the game with competition. Note that some of the prepared additional characters may give the same effect to operational characters.

Note that in the exemplary embodiment, two kinds of characters, additional characters and auxiliary characters, are prepared as a sub-character that is to be added to an operational character. Here, in another exemplary embodiment, only a single kind of sub-character (i.e., additional characters) may be added to an operational character.

In the exemplary embodiment, an example has been described in which a single player participates in the game with competition. Alternatively, the exemplary embodiment is applicable to a case where multiple players participate in the game with competition. For example, in another exemplary embodiment, an opponent character may be operated by a player different from a player who operates a player character. For example, in another exemplary embodiment, multiple players may each operate their own player character to compete with an opponent character(s) in the game with competition. In this case, multiple players may use their respective controllers to perform an input to a single game system 1. Alternatively, multiple players perform an input to respective game systems 1, which communicate with each other to execute the game with competition.

In the exemplary embodiment, an example has been described in which an acquisition game-mode information process is performed in which a player can acquire a sub-character. The exemplary embodiment is applicable to other game modes different from the acquisition game mode. For example, in another exemplary embodiment, the game system 1 may not execute the process of giving, to a player, an opponent sub-character that has been selected by the player.

The exemplary embodiment can be used in, for example, a game apparatus or a game program for the purpose of allowing a player to easily select a character in a game with competition.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game apparatus comprising one or more processors configured to: in a game in which a player character is operated to compete with an opponent character,
    generate an image of an opponent information screen showing the opponent character and an opponent additional character added to the opponent character for display;
    generate an image of a player information screen showing the player character and a player additional character selected according to an operational input added to the player character for display;
    the player additional character having an image, and being associated with at least information of an effect given to performance in the game of the player character to which the player additional character is added, and information about one of a plurality of a types, the one type having an advantage in the game over an opponent character of a first another type and a disadvantage in the game over an opponent character of a second another type,
    the image of the opponent information screen containing an image of the opponent character, an image of the opponent additional character, an icon image of the player character, and an icon image representing the type of the player additional character,
    the image of the player information screen containing an image of the player character, the image of the player additional character, the icon image representing the type of the player additional character, an icon image of the opponent character, and an icon image representing a type of the opponent additional character, make a screen transition to the player information screen in response to an operational input of a first screen transition during the opponent information screen being displayed;

make a screen transition to the opponent information screen in response to an operational input of a second screen transition during the player information screen being displayed;

start the game in response to an operational input of instruction to start the game during the opponent information screen or the player information screen being displayed; and control the player character in a virtual space according to an operational input, process the game based on the performance of the player character to which an effect associated with the selected player additional character is added, and the advantage and disadvantage associated with the type of the player additional character, and generate an image of a game screen for display.

2. The game apparatus according to claim 1, wherein the image of the game screen contains an image of the virtual space, the image of the player character, the image of the player additional character added to the player character, and an image of the type of the player additional character.

3. The game apparatus according to claim 2, wherein the image of the game screen further contains the image of the opponent character, the image of the opponent additional character added to the opponent character, and an image of the type of the opponent additional character.

4. The game apparatus according to claim 1, wherein the icon image representing the type of the player additional character and the icon image representing the type of the opponent additional character contain, in addition to the image of the type, an image showing advantage and disadvantage between the type of the player additional character and the type of the opponent additional character.

5. The game apparatus according to claim 1, wherein the game apparatus stores a plurality of additional characters that are selectable as the player additional character, in a storage unit, and the one or more processors are further configured to:
select the player additional character from the plurality of additional characters stored; and
store, into the storage unit, the opponent additional character as an additional character that the player is allowed to select as the player additional character, in the game, if a giving condition for giving the opponent additional character to the player is satisfied in the game.

6. The game apparatus according to claim 1, wherein the one or more processors are further configured to:
select the additional character or a character for which a type has not been set, as the opponent additional character, and
in the selecting, the type of the additional character is set as the type of the opponent additional character if the additional character has been selected as the opponent additional character, and a type that is previously set is set as the type of the opponent additional character if the character for which a type has not been set has been selected as the opponent additional character.

7. The game apparatus according to claim 1, wherein in the starting the game, the one or more processors generate an image of a waiting screen containing at least the image of the player character, the image of the player additional character, the icon image representing the type of the player additional character, the image of opponent character, the image of the opponent additional character, and the icon image representing the type of the opponent additional character, for display, during at least a portion of a period of time from the time of an operational input of instruction to start the game until the start of the game.

8. The game apparatus according to claim 7, wherein the image of the opponent information screen and the image of the player information screen further contain an instruction image of instruction to start the game, and the image of the waiting screen does not contain the instruction image.

9. The game apparatus according to claim 1, wherein in the opponent information screen, the image of the opponent additional character is smaller than the image of the opponent character and is larger than the icon image representing the type of the player additional character, and in the player information screen, the image of the player additional character is smaller than the image of the player character and is larger than the icon image representing the type of the opponent additional character.

10. A non-transitory computer-readable storage medium having stored therein a game program executable by one or more processors of an information processing apparatus, wherein the game program causes the one or more processors to:
in a game in which a player character is operated to compete with an opponent character,
generate an image of an opponent information screen showing the opponent character and an opponent additional character added to the opponent character for display;
generate an image of a player information screen showing the player character and a player additional character selected according to an operational input added to the player character for display;
the additional character having an image, being associated with at least information of an effect given to performance in the game of the player character to which the additional character is added, and information about one type of a plurality of types, the one type having an advantage in the game over an opponent character of a first another type and a disadvantage in the game over an opponent character of a second another type,
the image of the opponent information screen containing an image of the opponent character, an image of the opponent additional character, an icon image of the player character, and an icon image of representing a type of the player additional character,
the image of the player information screen containing an image of the player character, the image of the player additional character, the icon image representing the type of the player additional character, an icon image of the opponent character, and an icon image representing a type of the opponent additional character,
make a screen transition to the player information screen in response to an operational input of a first screen transition during the opponent information screen being displayed;

make a screen transition to the opponent information screen in response to an operational input of a second screen transition during the player information screen being displayed;

start the game in response to an operational input of instruction to start the game during the opponent information screen or the player information screen being displayed; and control the player character in a virtual space according to an operational input, process the game based on the performance of the player character to which an effect associated with the player additional character is added, and the advantage and disadvantage associated with the type of the player additional character, and generate an image of a game screen for display.

11. The non-transitory computer-readable storage medium according to claim 10, wherein the image of the game screen contains an image of the virtual space, the image of the player character, the image of the player additional character added to the player character, and an image of the type of the player additional character.

12. The non-transitory computer-readable storage medium according to claim 11, wherein the image of the game screen further contains the image of the opponent character, the image of the opponent additional character added to the opponent character, and an image of the type of the opponent additional character.

13. The non-transitory computer-readable storage medium according to claim 10, wherein the icon image representing the type of the player additional character and the icon image representing the type of the opponent additional character contain, in addition to the image of the type, an image showing advantage and disadvantage in type between the player additional character and the opponent additional character.

14. The non-transitory computer-readable storage medium according to claim 10, wherein the game program further causes the one or more processors to:

store a plurality of additional characters that are selectable as the player additional character, in a storage unit of the information processing apparatus;

select the player additional character from the plurality of additional characters stored; and store, into the storage unit, the opponent additional character as an additional character that the player is allowed to select as the player additional character, in the game, if a giving condition for giving the opponent additional character to the player is satisfied in the game.

15. The non-transitory computer-readable storage medium according to claim 10, wherein the game program further causes the one or more processors to:

select the additional character or a character for which a type has not been set, as the opponent additional character, and in the selecting, the type of the additional character is set as the type of the opponent additional character if the additional character has been selected as the opponent additional character, and a type that is previously set is set as the type of the opponent additional character if the character for which a type has not been set has been selected as the opponent additional character.

16. The non-transitory computer-readable storage medium according to claim 10, wherein in the starting the game, an image of a waiting screen containing at least the image of the player character, the image of the player additional character, the icon image representing the type of the player additional character, the image of the opponent character, the image of the opponent additional character, and the icon image representing the type of the opponent additional character, is generated for display during at least a portion of a period of time from the time of an operational input of instruction to start the game until the start of the game.

17. The non-transitory computer-readable storage medium according to claim 16, wherein the image of the opponent information screen and the image of the player information screen further contain an instruction image of instruction to start the game, and the image of the waiting screen does not contain the instruction image.

18. The non-transitory computer-readable storage medium according to claim 10, wherein in the opponent information screen, the image of the opponent additional character is smaller than the image of the opponent character and is larger than the icon image representing the type of the player additional character, and in the player information screen, the image of the player additional character is smaller than the image of the player character and is larger than the icon image representing the type of the opponent additional character.

19. A game system comprising one or more processors, wherein the one or more processors are configured to: in a game in which a player character is operated to compete with an opponent character, generate an image of an opponent information screen showing the opponent character and an opponent additional character added to the opponent character for display;

generate an image of a player information screen showing the player character and a player additional character selected according to an operational input added to the player character for display;

the player additional character having an image, being associated with at least information of an effect given to performance in the game of the player character to which the player additional character is added, and information about one type of a plurality of types, the one type having an advantage in the game over an opponent character of a first another type and a disadvantage in the game over an opponent character of a second another type, the image of the opponent information screen containing an image of the opponent character, an image of the opponent additional character, an icon image of the player character, and an own type icon image of representing a type of the player additional character, the image of the player information screen containing an image of the player character, the image of the player additional character, the icon image representing the type of the player additional character, an image of the opponent character, and an icon image showing a type of the opponent additional character, make a screen transition to the player information screen in response to an operational input of a first screen transition during the opponent information screen being displayed;

make a screen transition to the opponent information screen in response to an operational input of a second transition during the player information screen being displayed;

start the game in response to an operational input of instruction to start the game during the opponent information screen or the player information screen being displayed; and control the player character in a virtual space according to an operational input, process the game based on the performance of the player character to which an effect associated with the player additional character is added, and the advantage and disadvantage associated with the type of the player additional character, and generate an image of a game screen for display.

20. A game processing method executable by a game system, comprising: in a game in which a player character is operated to compete with an opponent character, generating an image of an opponent information screen showing the opponent character and an opponent additional character added to the opponent character for display;

generating an image of a player information screen showing the player character and a player additional character selected according to an operational input added to the player character for display;

wherein the player additional character having an image, being associated with at least information of an effect given to performance in the game of the player character to which the player additional character is added, and information about one type of a plurality of types, the one type having an advantage in the game over an opponent character of a first another type and a disadvantage in the game over an opponent character of a second another type, the image of the opponent information screen containing an image of the opponent character, the image of the opponent additional character, an icon image of the player character, and an icon image representing a type of the player additional character, and the image of the player information screen containing an image of the player character, an image of the player additional character, the icon image representing a type of the player additional character, an icon image of the opponent character, and an icon image representing a type of the opponent additional character, making a first transition to the player information screen in response to an operational input of a first screen transition during the opponent information screen being displayed;

making a second transition to the opponent information screen in response to an operational input of a second screen transition to the opponent information screen during the player information screen being displayed;

starting the game in response to an operational input of instruction to start the game during the opponent information screen or the player information screen being displayed; and controlling the player character in a virtual space according to an operational input, processing the game based on the performance of the player character to which an effect associated with the player additional character is added, and the advantage and disadvantage associated with the type of the player additional character, and generating an image of a game screen for display.

* * * * *